US012663767B2

(12) United States Patent
Plochowietz et al.

(10) Patent No.: US 12,663,767 B2
(45) Date of Patent: Jun. 23, 2026

(54) SYSTEM AND METHOD FOR HYBRID-MODEL-BASED MICRO-ASSEMBLY CONTROL WITH THE AID OF A DIGITAL COMPUTER

(71) Applicant: Genesee Valley Innovations, LLC, Santa Clara, CA (US)

(72) Inventors: Anne Plochowietz, Mountain View, CA (US); Anand Ramakrishnan, Worcester, MA (US); Warren Jackson, San Francisco, CA (US); Lara S. Crawford, Belmont, CA (US); Bradley Rupp, San Francisco, CA (US); Sergey Butylkov, Van Nuys, CA (US); Jeng Ping Lu, Fremont, CA (US); Eugene M. Chow, Palo Alto, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 385 days.

(21) Appl. No.: 18/462,332

(22) Filed: Sep. 6, 2023

(65) Prior Publication Data

US 2024/0036534 A1     Feb. 1, 2024

Related U.S. Application Data

(63) Continuation of application No. 17/326,902, filed on May 21, 2021, now Pat. No. 11,762,348.

(51) Int. Cl.
*G05B 13/04*        (2006.01)
*G05B 13/02*        (2006.01)
(Continued)

(52) U.S. Cl.
CPC ......... *G05B 13/048* (2013.01); *G05B 13/027* (2013.01); *G05B 13/042* (2013.01); *G06N 3/08* (2013.01); *G06N 7/08* (2013.01)

(58) Field of Classification Search
None
See application file for complete search history.

(56) References Cited

U.S. PATENT DOCUMENTS

| | | | | |
|---|---|---|---|---|
| 6,243,696 B1 * | 6/2001 | Keeler | ................. | G06N 3/0499 |
| | | | | 706/907 |
| 2005/0125474 A1 * | 6/2005 | Pednault | ................. | G06F 17/18 |
| | | | | 708/400 |

(Continued)

FOREIGN PATENT DOCUMENTS

| | | | |
|---|---|---|---|
| CN | 101431665 | | 5/2009 |
| CN | 101431665 A | * | 5/2009 |

OTHER PUBLICATIONS

Kumar, "Introduction to the Gradient Boosting Algorithm", May 2020, Analytics Vidhya, pp. 1-3 (Year: 2020).

(Continued)

*Primary Examiner* — David Earl Ogg
(74) *Attorney, Agent, or Firm* — Leonid Kisselev

(57)        ABSTRACT

Control loop latency can be accounted for in predicting positions of micro-objects being moved by using a hybrid model that includes both at least one physics-based model and machine-learning models. The models are combined using gradient boosting, with a model created during at least one of the stages being fitted based on residuals calculated during a previous stage based on comparison to training data. The loss function for each stage is selected based on the model being created. The hybrid model is evaluated with data extrapolated and interpolated from the training data to prevent overfitting and ensure the hybrid model has sufficient predictive ability. By including both physics-based and machine-learning models, the hybrid model can account for both deterministic and stochastic components involved in (Continued)

the movement of the micro-objects, thus increasing the accuracy and throughput of the micro-assembly.

20 Claims, 16 Drawing Sheets

(51) Int. Cl.
    *G06N 3/08*           (2023.01)
    *G06N 7/08*           (2006.01)

(56) References Cited

U.S. PATENT DOCUMENTS

| | | | |
|---|---|---|---|
| 2018/0081347 A1* | 3/2018 | Matei ..................... | H04N 7/183 |
| 2020/0207617 A1* | 7/2020 | Plochowietz ........... | H01L 24/95 |
| 2020/0265296 A1* | 8/2020 | Olabiyi .................. | G06N 3/047 |
| 2022/0147672 A1* | 5/2022 | Nistala ................... | G06Q 50/04 |
| 2022/0156881 A1 | 5/2022 | Matei et al. | |
| 2022/0245307 A1 | 8/2022 | Kothnur et al. | |

OTHER PUBLICATIONS

J. Willard, X. Jia, S. Xu, M. Steinbach, and V. Kumar, "Integrating physics-based modeling with machine learning: A survey," arXiv:2003.04919 [physics.stat] (2020).

* cited by examiner

70

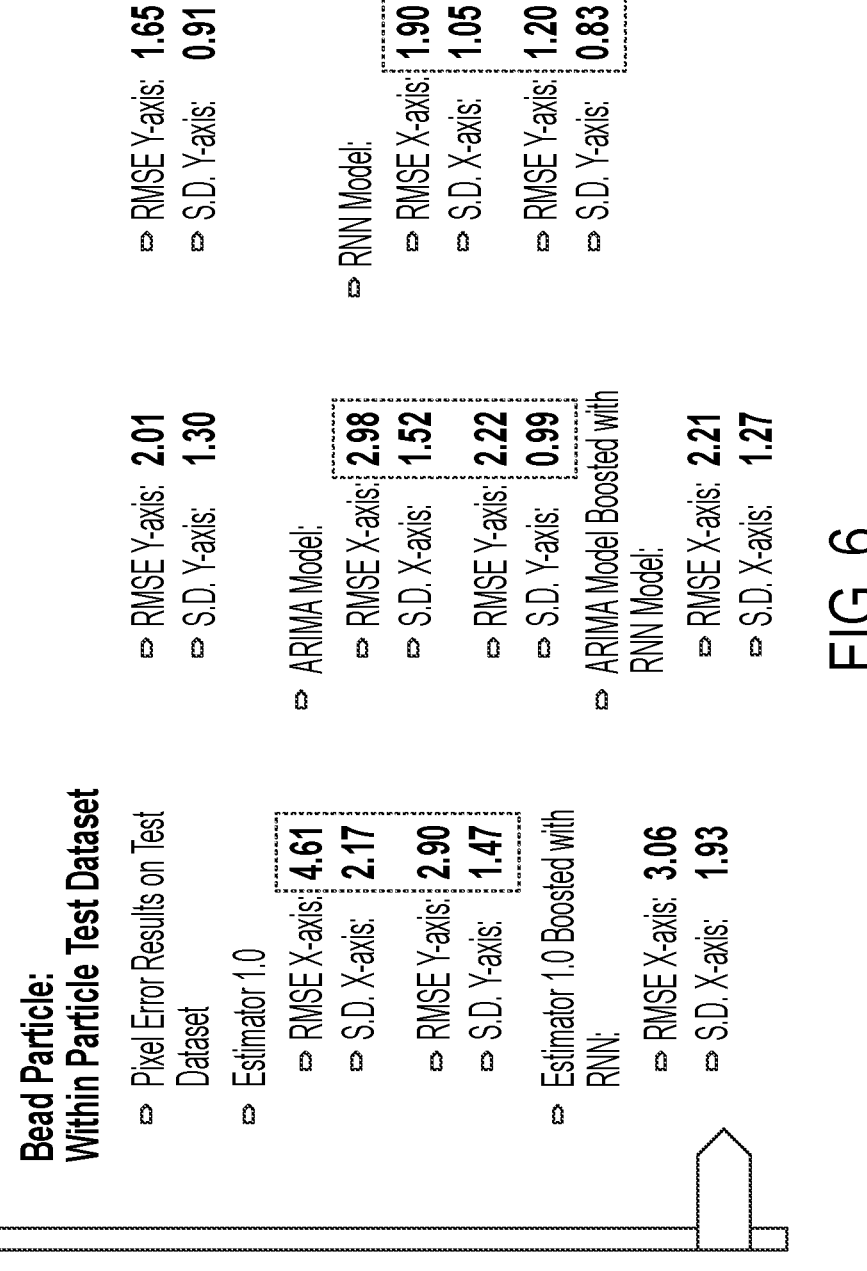

Bead Particle:
Within Particle Test Dataset

- Pixel Error Results on Test Dataset
- Estimator 1.0
  - RMSE X-axis: 4.61
  - S.D. X-axis: 2.17
  - RMSE Y-axis: 2.90
  - S.D. Y-axis: 1.47
- Estimator 1.0 Boosted with RNN:
  - RMSE X-axis: 3.06
  - S.D. X-axis: 1.93
  - RMSE Y-axis: 2.01
  - S.D. Y-axis: 1.30
- ARIMA Model:
  - RMSE X-axis: 2.98
  - S.D. X-axis: 1.52
  - RMSE Y-axis: 2.22
  - S.D. Y-axis: 0.99
- ARIMA Model Boosted with RNN Model:
  - RMSE X-axis: 2.21
  - S.D. X-axis: 1.27
  - RMSE Y-axis: 1.65
  - S.D. Y-axis: 0.91
- RNN Model:
  - RMSE X-axis: 1.90
  - S.D. X-axis: 1.05
  - RMSE Y-axis: 1.20
  - S.D. Y-axis: 0.83

FIG. 6

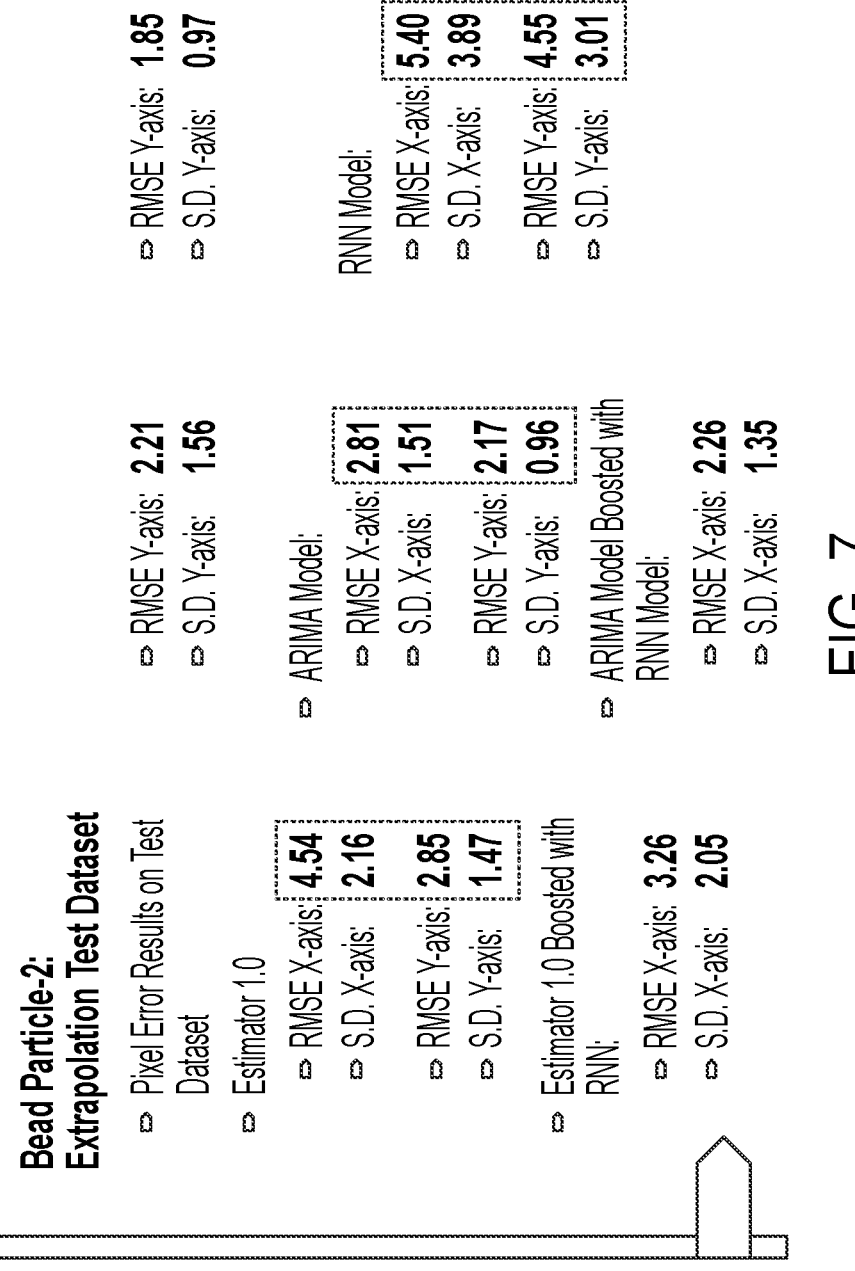

Bead Particle-2:
Extrapolation Test Dataset

▫ Pixel Error Results on Test Dataset

▫ Estimator 1.0

▫ RMSE X-axis: 4.54

▫ S.D. X-axis: 2.16

▫ RMSE Y-axis: 2.85

▫ S.D. Y-axis: 1.47

▫ RMSE Y-axis: 2.21

▫ S.D. Y-axis: 1.56

▫ Estimator 1.0 Boosted with RNN:

▫ RMSE X-axis: 3.26

▫ S.D. X-axis: 2.05

▫ ARIMA Model:

▫ RMSE X-axis: 2.81

▫ S.D. X-axis: 1.51

▫ RMSE Y-axis: 2.17

▫ S.D. Y-axis: 0.96

▫ ARIMA Model Boosted with RNN Model:

▫ RMSE X-axis: 2.26

▫ S.D. X-axis: 1.35

▫ RMSE Y-axis: 1.85

▫ S.D. Y-axis: 0.97

RNN Model:

▫ RMSE X-axis: 5.40

▫ S.D. X-axis: 3.89

▫ RMSE Y-axis: 4.55

▫ S.D. Y-axis: 3.01

FIG. 7

Spherical Particle Estimator 1.0

Time of simulation

Spherical Particle RNN

Spherical Particle RNN Boosted ARIMA

SYSTEM AND METHOD FOR HYBRID-MODEL-BASED MICRO-ASSEMBLY CONTROL WITH THE AID OF A DIGITAL COMPUTER

FIELD

This application relates in general to micro-assembly control, and, in particular, to a system and method for hybrid-model-based micro-assembly control with the aid of a digital computer.

BACKGROUND

Micro- and nano-scale particle manipulation has received a lot of research interest. The degree to which control can be exercised over assembly of micro-objects, objects whose dimensions measure in microns, and nano-objects, objects whose dimensions measure in nanometers, can make a significant difference in a number of technologies, including in micro-fabrication, biology and medicine. For example, manufacturing of reconfigurable electrical circuits can be improved by being able to accurately control position of micro-objects such as capacitors and resistors to manufacture a circuit with a desired behavior. Similarly, production of photovoltaic solar cell arrays can benefit from being able to put photovoltaic cells with certain qualities into particular positions on the arrays. Such cells can be too small to allow for a desired placement of the cells via human or robotic manipulation, and another kind of transportation mechanism is needed. Micro-assembly and nano-assembly of particles can also be used to engineer the microstructure of materials, such as of biological cells being assembled into tissue. Many other technological fields exist where increasing control over assembly of micro-and-nano objects can provide significant benefits.

A lot of the techniques for use in micro- and nano-particle manipulation use electrodes to generate electrode potential to move the particles of interest towards a desired direction. The initial positions of the particles are determined using a sensor, and the electrode potentials are generated based on the desired positions and the initial positions. However, the throughput and accuracy of such systems is significantly restricted by control loop latency, a delay between when a particle is at a particular position and when the electrode potentials are generated based on the particle being at that particular position. The exact length of the delay depends on the software and hardware of the system used for the manipulation of the particles. The delay has multiple components. One component is actuation delay, the delay between when a sprite (a control signal for the electrodes) is generated and when the electrode potentials specified by the sprite are generated by the electrodes. Another component of the delay is sensing delay, which is the time between a sensor observing a particle occupying a particular position and the time. The analysis of the signal of the sensor is completed to obtain the particle position. Such delay includes the time to stream the captured image to memory to store, and to send the image data to image analysis to determine the location, and to run the image analysis algorithm. These delays can be up to 80 ms-100 ms, and up to 300 ms or more depending on the various delays and processor loads, which at the frame rate of 60 hz or slower, can account for up to five frames.

Predicting the delay, and consequently an actual position of a micro- or nano-sized particle that needs to be moved, would allow to improve the accuracy and efficiency of the micro- and nano-assemblies. Such modeling generally makes use of physics-based models, models that make use of known physical characteristics of the manipulation set-up, environment (such as with the assembly being in the air, liquid, on earth, in space, or in another environment) and the particles being moved. However, physics-based models for closed loop systems do not easily account for dynamic changes in control latency that occur during micro-or-nano-particle manipulation, such as particle rotation, target assignment, and transfer that occur on small or large subsets of particles. Such physics-based models also do not easily account for dynamic changes between different settings of the manipulation conditions, such use of different types of particles or different illumination conditions. Such physics-based models are also not robust in modeling a particular variable within the particular manipulation set-up, such as particle stiction or particle rocking motion, or at modeling a parameter with the unknown value, such as the average numbers of pixels a particle translates during a control cycle.

Accordingly, there is a need for a way to accurately account for control loop latency to predict an actual position of a particle being moved because of the generated electrode potentials.

SUMMARY

Control loop latency can be accounted for in predicting positions of micro-objects being moved by using a hybrid model that includes both at least one physics-based model and machine-learning model. The models are combined using gradient boosting, with a model created during at least one of the stages being fitted based on residuals calculated during a previous stage based on comparison to training data. The loss function for each stage is selected based on the model being created. The hybrid model is evaluated with data extrapolated and interpolated from the training data to prevent overfitting and ensure the hybrid model has sufficient predictive ability. By including both physics-based and machine-learning models, the hybrid model can account for both deterministic and stochastic components involved in the movement of the micro-objects, thus increasing the accuracy and throughput of the micro-assembly.

In one embodiment, a system and method for hybrid-model-based micro-assembly control with the aid of a digital computer is provided. One or more parameters of a closed-loop system for positioning one or more of a plurality of micro-objects are obtained, the system including a plurality of programmable electrodes, the electrodes configured to induce movements of the micro-objects when the micro-objects are proximate to electrodes upon actuations of the electrodes, each of the actuations including a generation of one or more electric potentials by one or more of the electrodes. Recorded data including input states and output states associated with previous movements of one or more of the plurality of the micro-objects due to earlier ones of the actuations is obtained. A hybrid model for predicting a position of at least one of the micro-objects following one of the actuations is built, the hybrid model including a plurality of models, using the training data via gradient boosting, including: defining a number of the models to be included into the hybrid model based on user input; defining a physics-based model as one of the models using one or more of the parameters; making using the physics-based model a prediction regarding one of the positions of one of the micro-objects using one of the input states; using a loss function to determine a residual between the physics-based model prediction and one of the output states associated with the one input state used for the physics-based model prediction; building one of the remaining models using the residual associated with the physics-based model; and processing one or more of the remaining models in the hybrid model until a number of the models built equals the defined number, wherein at least some of the processed remaining models are machine-learning models. The processing includes: making using that remaining model a prediction regarding one of the positions of one of the micro-objects using one of the input states; using a further loss function to determine a residual between that remaining model's prediction and one of the output states associated with the one input state used for that remaining model's prediction; and building another one of the remaining models using the residual for that remaining model's prediction/ The closed-loop system is controlled to perform one or more of the actuations based on the hybrid model.

In a further embodiment, a system and method for hybrid-model-based micro-assembly control utilizing loss function selection with the aid of a digital computer is provided. One or more parameters of a closed-loop system for positioning one or more of a plurality of micro-objects are obtained, the system including a plurality of programmable electrodes, the electrodes configured to induce movements of the micro-objects when the micro-objects are proximate to electrodes upon actuations of the electrodes, each of the actuations including a generation of one or more electric potentials by one or more of the electrodes. Recorded data including input states and output states associated with previous movements of one or more of the plurality of the micro-objects due to earlier ones of the actuations is obtained. A hybrid model for predicting a position of at least one of the micro-objects following one of the actuations is built, the hybrid model including a plurality of models, using the training data via gradient boosting, including: defining a number of the models to be included into the hybrid model based on user input; defining a physics-based model as one of the models using one or more of the parameters; making using the physics-based model a prediction regarding one of the positions of one of the micro-objects using one of the input states; selecting a loss function; using the loss function to determine a residual between the physics-based model prediction and one of the output states associated with the one input state used for the physics-based model prediction; building one of the remaining models using the residual associated with the physics-based model; and processing one or more of the remaining models in the hybrid model until a number of the models built equals the defined number, wherein at least some of the processed remaining models are machine-learning models. The processing includes: making using that remaining model a prediction regarding one of the positions of one of the micro-objects using one of the input states; selecting a further loss function for that remaining model; using the further loss function to determine a residual between that remaining model's prediction and one of the output states associated with the one input state used for that remaining model's prediction; and building another one of the remaining models using the residual for that remaining model's prediction/ The closed-loop system is controlled to perform one or more of the actuations based on the hybrid model.

In a still further embodiment, a system and method for hybrid-model-based micro-assembly control utilizing stochastic-model-based loss function selection with the aid of a digital computer is provided. One or more parameters of a closed-loop system for positioning one or more of a plurality of micro-objects are obtained, the system including a plurality of programmable electrodes, the electrodes configured to induce movements of the micro-objects when the micro-objects are proximate to electrodes upon actuations of the electrodes, each of the actuations including a generation of one or more electric potentials by one or more of the electrodes. Recorded data including input states and output states associated with previous movements of one or more of the plurality of the micro-objects due to earlier ones of the actuations is obtained. A hybrid model for predicting a position of at least one of the micro-objects following one of the actuations is built, the hybrid model including a plurality of models, using the training data via gradient boosting, including: defining a number of the models to be included into the hybrid model based on user input; defining a physics-based model as one of the models using one or more of the parameters; making using the physics-based model a prediction regarding one of the positions of one of the micro-objects using one of the input states; selecting a loss function based on a stochastic model associated with the physics-based model prediction; using the loss function to determine a residual between the physics-based model prediction and one of the output states associated with the one input state used for the physics-based model prediction; building one of the remaining models using the residual associated with the physics-based model; and processing one or more of the remaining models in the hybrid model until a number of the models built equals the defined number, wherein at least some of the processed remaining models are machine-learning models. The processing includes: making using that remaining model a prediction regarding one of the positions of one of the micro-objects using one of the input states; selecting a further loss function for that remaining model based on a further stochastic model associated with that remaining model's prediction; using the further loss function to determine a residual between that remaining model's prediction and one of the output states associated with the one input state used for that remaining model's prediction; and building another one of the remaining models using the residual for that remaining model's prediction. The closed-loop system is controlled to perform one or more of the actuations based on the hybrid model.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 6 is a diagram showing test results of the Estimator 1.0 as compared to the use of the hybrid model that included ARIMA model as the machine-learning model and the use of the hybrid model that included RNN model as the machine-learning mode.

FIG. 7 is diagram showing results of the use of the Estimator 1.0 versus ARIMA model and RNN model within extrapolation test data set.

DETAILED DESCRIPTION

Figure 1:
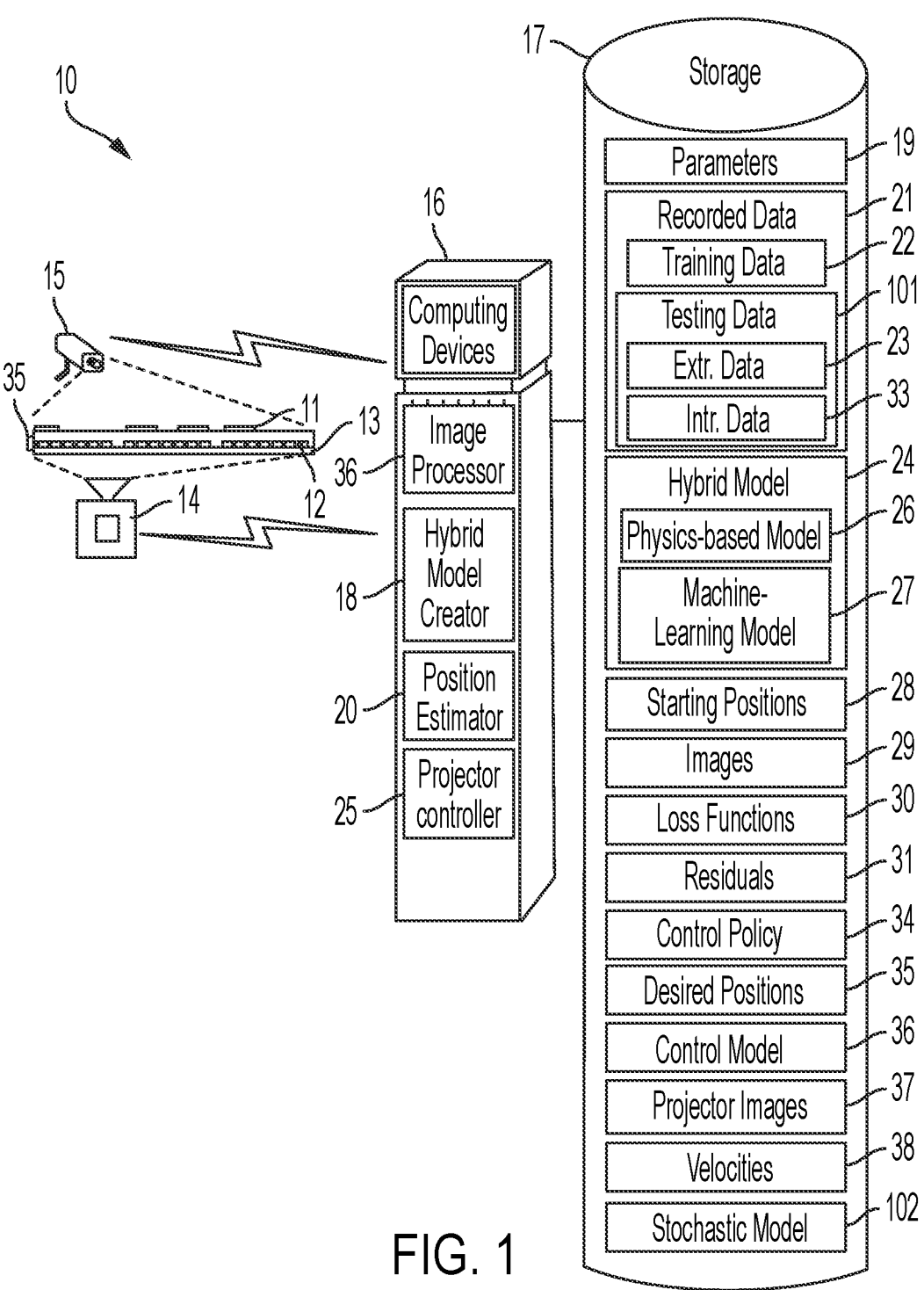
FIG. 1 is a block diagram showing a system for machine-learning-based position estimation for use in micro-assembly control with the aid of a digital computer.

The system and method described below allow to take into account the control loop latency when generating control signals, thus allowing to improve the accuracy of positioning achieved using a micro-or-nano-assembly. As described below, the system and method make use of a hybrid model for predicting positions of micro-objects following actuation, with the hybrid model including one or more physics-based models and one or more machine-learning models. Whereas physics-based models have advantages of not requiring any data to be built, allowing for extrapolation beyond the data used to fit the parameters, and providing high interpretability of their predictions, they only capture a small part of the behavior of the system used to perform the micro-assembly. The complete behavior of the system 10 includes unmodeled degrees of freedom, and the use of the machine-learning models allows to capture these unmodeled degrees of freedom. The total system behavior, given by Y is a function of the physics model f(X; θ) where X is the previous history and measurements, θ are parameters, the noise N(Φ) where Φ are noise parameters of stochastic noise model. A neural network function NN(X; W), which is a function of the inputs and trainable weights W, captures the unmodeled degrees of freedom in accordance with:

$$Y = f(X; \theta) + \mathcal{N}(\varnothing) + |NN(X; W) \tag{1}$$

The use of the hybrid model allows to combine the advantages of the physics-based models (interpretability, stability, and extrapolative ability) with flexibility of machine-learning models and their ability to capture unmodeled degrees of freedom, resulting in a more accurate predictions of micro-object positions and thus improved throughput of the micro-assembly. The physics-based models account for deterministic components of the system while the machine-learning models account for stochastic components of the system.

While in the description below, the objects being moved are described as micro-objects, the same techniques could be applied for controlling positions of nano-objects. Further, while the hybrid model described below is described as applied to a particular actuation hardware, in a further embodiment, the hybrid model can be used to predict micro(or nano)-object positions that are put in motion using a different hardware setup. In a still further embodiment, the hybrid model could be used for control of other kinds of systems. For example, the hybrid model can be applied to the control of a motor driven mechanical linkage with backlash. The physics of the motor and rotation of the mechanical linkage can easily be modeled using physical models including the physical parameters of the motor and link such as the moment of inertia, and series resistance of the windings. The linkage backlash is much more complicated, being nonlinear and depending on the previous history. Subjecting the motor system to a random series of motion controls varying frequency and amplitude and comparing the measured response to the expected response from the physical model, the error of the physics model as a function of inputs and state of the motor can be obtained. This data is used for supervised training of a neural network, which is trained to predict the backlash error. The nearby errors in time are forced to be uncorrelated providing further constraints on overfitting. The remaining errors are fit to a stochastic model which in this case is independent, identically distributed Gaussian noise. The noise variance can be determined from the residuals from the physics and neural network models. This hybrid model is used for system identification, namely, predicting the response of the system as a function various control actions and the past and present state of the system. This prediction can be incorporated into various control algorithms such as model predictive control to achieve improved performance over simpler previous control algorithms such as the typical proportional integral derivative (PID) control algorithms. Still other uses of the hybrid model are possible.

FIG. 1 is a block diagram showing a system 10 for machine-learning-based position estimation for use in micro-assembly control with the aid of a digital computer. The system 10 allows for coordinated assembly involving multiple objects 11, such as micro-objects. The size of the objects 11 vary between being on the nano scale (<1 μm), and micro-scale (1 um to 100 s of μm), though other sizes are possible. The objects 11 can be spherical, though other shapes are also possible, such as a rectangular shape, though still other shapes are also possible. In one embodiment, the diameter of the spherical objects 11 can be 5 μm to 50 μm, though other diameters are also possible. In one embodiment, the dimension of the rectangular objects 11 can be 200 μm×300 μm×100 μm, though other dimensions are also possible. The objects 11 are immersed in a dielectric fluid (not shown) contained within an enclosure (not shown), with a layer of film (not shown) being below the dielectric fluid contained within the enclosure. In one embodiment, the dielectric fluid is Isopar® M, manufactured by ExxonMobil Chemical Company of Spring, Texas, though other dielectric fluids 17 are also possible. The dielectric fluid can include one or more additives, such as with di-2-ethylhexylsulfosuccinate (AOT) charge director molecules, though other additives are also possible. The objects 11 can be made out of aluminum oxide (AlOx), though other materials are possible. Each of the objects 11 can be a semiconductor chip, an integrated circuit, a particle, a nanodevice or structure, or any object which an array of electrodes can physically manipulate. In the description below, the objects 11 are referred to as micro-objects 11, though other ways to name the objects 11 are possible.

Below the suspended micro-objects 11 are a plurality of programmable electrodes 12 forming an array 35, the electrodes 12 configured to generate a dynamic potential energy landscape for manipulating objects with both dielectrophoretic ("DEP") and electrophoretic ("EP") forces. The film is laminated on the electrodes 12. In one embodiment, the electrodes can be square shapes and made off copper, though other shapes and materials are also possible. In one embodiment, the dimensions of a square electrode 12 can be a 16 μm width and 100 nm thickness, though other dimensions are also possible in a further embodiment. The array 35 can include multiple rows of the electrodes 12, with each row including multiple electrodes 12.

The electric potentials generated by the electrodes 12 are controlled by array 13 of photo-transistors, the array including an active-matrix photo-transistor backplane that is set on glass. The multiple photo-transistors on the backplane form the array 13, with each of the photo-transistors in the array 13 being in control of the electric potentials generated by a single electrode 12. In particular, each of the photo-transistors in the array 13 is attached to one electrode 12. The array 13 of phototransistors can have additional characteristics, such as those described in Rupp et al., "Chiplet microassembly printer," 2019 IEEE 69th Electronic Components and Technology Conference (ECTC), pages 1312-1315, May 2019, the disclosure of which is incorporated by reference.

The array 13 is optically addressed by a video projector 14 to enable dynamic control of the electrostatic energy potential and manipulation of the positions of multiple micro-objects 11 at the same time. In particular, the video projector 14 is used to address each photo-transistor controlled electrode 12, allowing for facile zoom factor changes and stitching into larger arrays. The video projector 14 actuates the electrodes 12 by projecting pre-defined patterns: images 37 that are generated based on control inputs: the electric potentials to be generated by the electrodes to achieve desired motion of the micro-objects 11, as further described below. The pixelated light projected by the projector 14 that makes up the image charges each individual phototransistor 13 in the array to the degree necessary so that the electrode 12 charged by that phototransistor produces the desired electric potentials. In one embodiment, voltages of up to +/−200V are controlled by these photo-transistors to display a dynamically varying complicated electric potential landscape. A single voltage signal is synchronized with optical addressing to charge storage capacitors on each pixel. Dynamic electric field patterns are generated by refreshing the projected image pattern (control input). The array 13 with 50 μm, 10 μm and even 3 μm pitch has been built, with pitch being distance between centers of the electrodes to which the phototransistors are attached. Dielectric fluid 17 media (isopar M) and various additives are used to control the charge.

The system 10 further includes a high-speed camera 15 that tracks locations of the micro-objects 11 being moved. Both the video projector 14 and the camera are interfaced to one or more computing devices 16, which can control the electrodes 12 through the projector 14 to induce a formation of a desired micro-object 11 pattern. Other micro-object 11 patterns are also possible. In a further embodiment, another kind of sensor (such as utilizing capacitive sensing) could be used to measure and track a position of a micro-object. In a still further embodiment, electrode array 35 could have an integrated active matrix addressing electronics, the potential on each electrode of the array are updated electronically upon the electrode potentials that are necessary for desired micro-object movement having been generated. Additional characteristics of the array 13, the electrodes 12, the video projector 14, and the camera 15, such as described in U.S. Patent Publication Application No. US20200207617, published Jul. 2, 2020, to Plochowietz et al, the disclosure of which is incorporated by reference. Also, additional components of the system 10 interacting with the array 14, the electrodes 12, the video projector 14, and the camera 15, are possible.

The connections between the one or more computing devices 16 can be direct, such as a via wires or a wireless connection to physically proximate one or more computing devices 16, or the connection can be via an Internetwork to physically remote one or more computing devices 16, such as via the Internet or a cellular network. The one or more computing devices 16 include one or more circuits that perform data processing, such as computer processors, though other kinds of circuits for processing data are possible. In one embodiment, the computer processors can be central processing units (CPUs), graphics processing unit (GPU), or a mixture of CPUs and GPU, though still other kinds of processors or a mixture of processors are possible. In one embodiment, two or more of the processors can perform processing in parallel, as further described in U.S. Patent Application Publication No. 20220156881, Published May 19, 2022 to Matei et al., the disclosure of which is incorporated by reference. Additional efficiency and improved scalability can be obtained through parallel computation capabilities for tracking multiple particles and for voltage pattern generation. In a still further embodiment, circuits other than CPUs and GPUs can perform the data processing described above.

While the one or more computing devices 16 are shown as a server, other types of computer devices are possible. The computing devices 16 can include one or more modules for carrying out the embodiments disclosed herein. The modules can be implemented as a computer program or procedure written as source code in a conventional programming language and is presented for execution by the processors as object or byte code. Alternatively, the modules could also be implemented in hardware, either as integrated circuitry or burned into read-only memory components, and each of the computing devices 16 can act as a specialized computer. For instance, when the modules are implemented as hardware, that particular hardware is specialized to perform the computations and communication described above and other computers cannot be used. Additionally, when the modules are burned into read-only memory components, the computer storing the read-only memory becomes specialized to perform the operations described above that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components. For example, the computing device 16 can include other components found in programmable computing devices, such as input/output ports, network interfaces, and non-volatile storage, although other components are possible. In the embodiment where the computing devices 16 are servers, the server can also be cloud-based or be dedicated servers.

The one or more computing devices 16 are interfaced to a storage 17 and execute a hybrid model creator 18 that obtains parameters 19 of the system 10 and stores the parameters 19 in the storage 17. The parameters 19 can include the diameter of the micro-objects 11, the dimensions of the electrodes 12, the dielectric fluid constant (e.g. as ε=2), the fixed positions of the electrodes 12, material of the micro-objects 11 and electrodes 12, and the vertical distance between the micro-objects 11 and the electrodes 12 ("height" of the micro-objects 11). Other parameters 19 are still possible. The hybrid model creator 18 also creates a hybrid model 24 for predicting a position of a particular micro-object 11, which can also be stored in the storage 17. The hybrid model 24 includes a physics-based model 26 that predicts the position of a micro-object 11 following electrode actuation based on the generated control signal (and consequently the electric potentials generated by the electrodes), the velocities of the micro-objects 11 at a particular time, and the starting positions 28 (positions before actuation) determined based on the micro-objects images 29 captured by the camera 15. An example of a physics-based model is described by J. Willard, X. Jia, S. Xu, M. Steinbach, and V. Kumar, "Integrating physics-based modeling with machine learning: A survey," arXiv:2003.04919 [physics.stat] (2020), the disclosure of which is incorporated by reference, though other physics-based models 26 are possible. The hybrid model 24 further includes one or more machine-learning models 27. The machine-learning models can include deep models (machine-learning models that utilize a neural network made of multiple layers), linear models, dense models, Autoregressive Integrated Moving Average (ARIMA) models, a recurrent neural network (RNN) model, though other kinds of machine-learning models are possible. In one embodiment, the SimpleRNN layer of the ARIMA model can be changed to LSTM (Long short-term memory, RNN architecture), though other kinds of ARIMA models are possible. As mentioned above, the physics-based models 26 account for deterministic behavior of the system 10 while the machine-learning models 27 account for deterministic aspects of the system 10. Thus, the behavior of the system 10 as a whole can be given by Y as a functions of the physics model f(X; θ) where X is recorded data associated with previous actuations of the system 10 (referred to as training data 22 below), θ are parameters, the noise N(Φ) where Φ are noise parameters of stochastic noise model, the system behavior being further represented by a neural network function NN(X; W) (associated with the machine-learning models 27) which is a function of the inputs and trainable weights.

Figure 11:
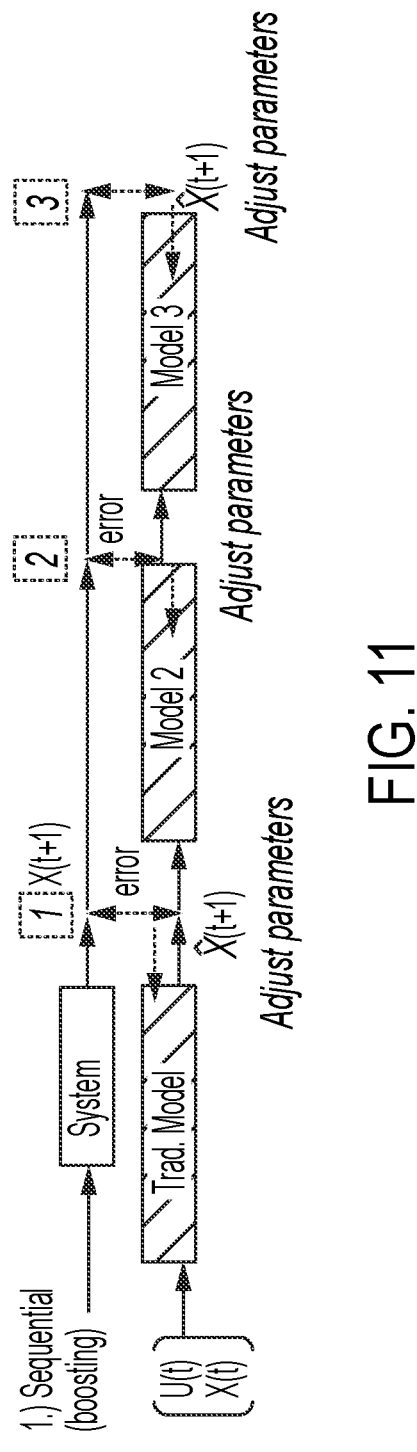
FIG. 11 is a diagram illustrating gradient boosting in accordance with one embodiment.

The hybrid-model 24 is built using training data 21. The training data describes states associated with movement of the micro-objects 11, including: (1) the input state of a micro-object which minimally is the position and velocity of the micro-object 11 (but can also include other states such as orientation and angle)before a control input actuates the electrodes; (2) the control actions, such as the illumination pattern applied by the video projector 14 to the photo-transistor controlled electrodes 12 (which is indicative of the electric potentials generated by the electrodes) or another force applied to the micro-object 11; (3) output state resulting from the input data (a position a micro-object 11 has achieved following the actuation at a particular time and the micro-object's velocity). The training data 22 is used for supervised training of the sequence of parametric models that make up the hybrid model 24, as illustrated by FIG. 11. The "tradition" model shown in FIG. 11 can be a physics-based model 24 followed by, for example, a neural network model for Model 2 (shown in FIG. 11) on the residuals and fitting further models on the residuals.

The hybrid model is tested using interpolative data 33 (also referred to as interpolated data 33) and extrapolative data 23 (also referred to as extrapolated data 23), which are used as test data 101, as further described below. The interpolative data 33 can originally be part of the same data set as the training data 22 and includes the input states, the control actions, and the output states whose values are within the range of the values of the training data 21. The extrapolated training data 23 can also be part of the same data set as the training data 21 and also includes the input states, the control actions, and the output states, but includes values for at least one of the input states, the control actions, and the output states are outside of the range of values of the input states, the control actions, and the output states of the training data 21. For example, at least one of the positions of a micro-object 11, the velocity, or the actuation applied to the micro-object 11 is for values which extend beyond those used in the training data 21.

Figure 5A:
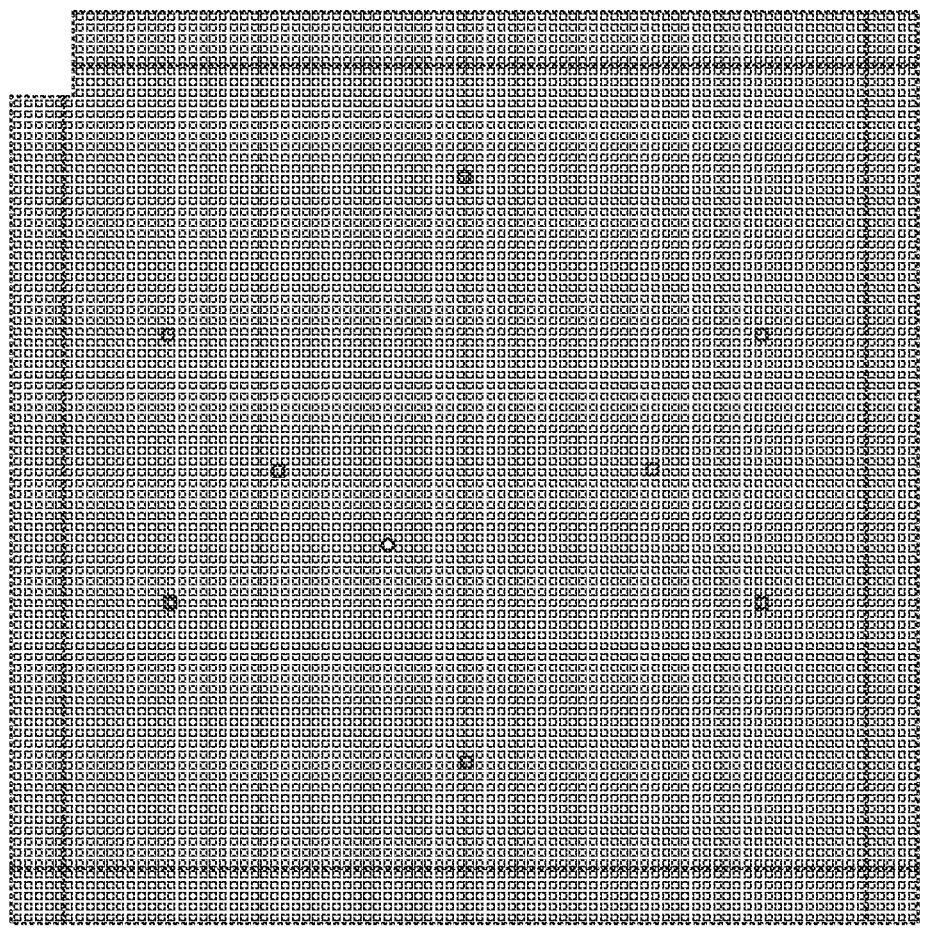
FIGS. 5A and 5B are illustrations showing examples of positions taken by a micro-objects in recorded training data (shown with reference to FIG. 5A) and the positions of the micro-objects extrapolated from the recorded training data (shown with reference to FIG. 5B).
Figure 5B:
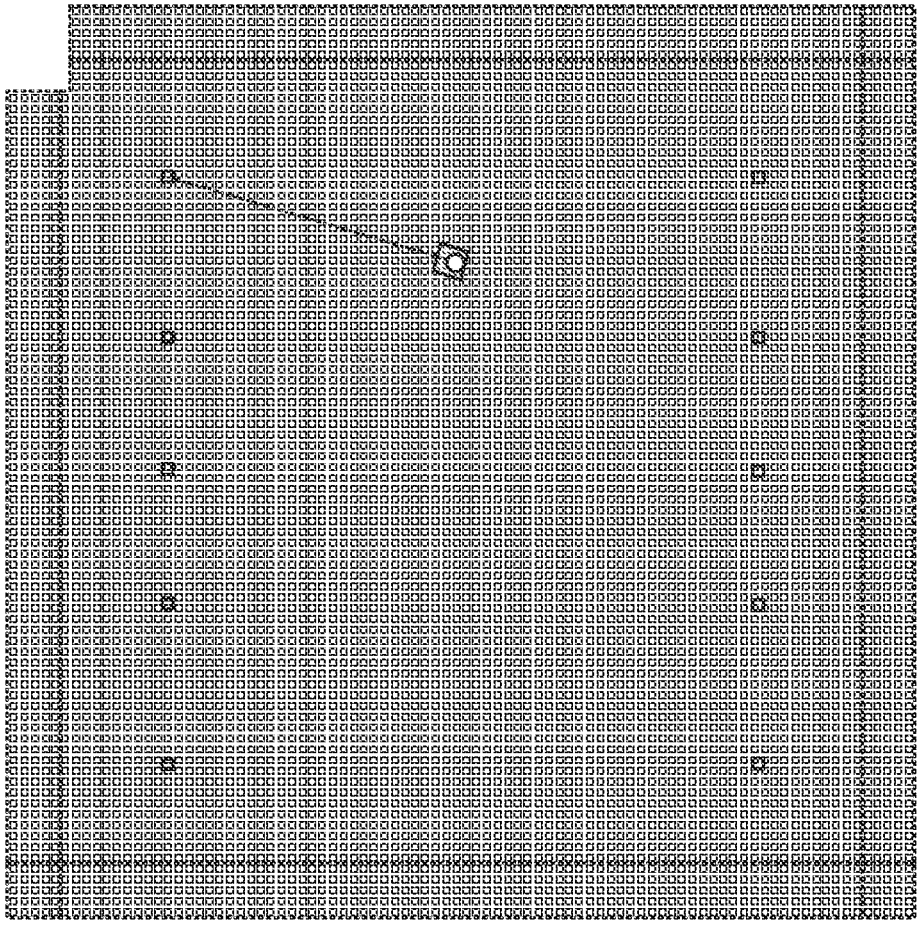
Figure 12:
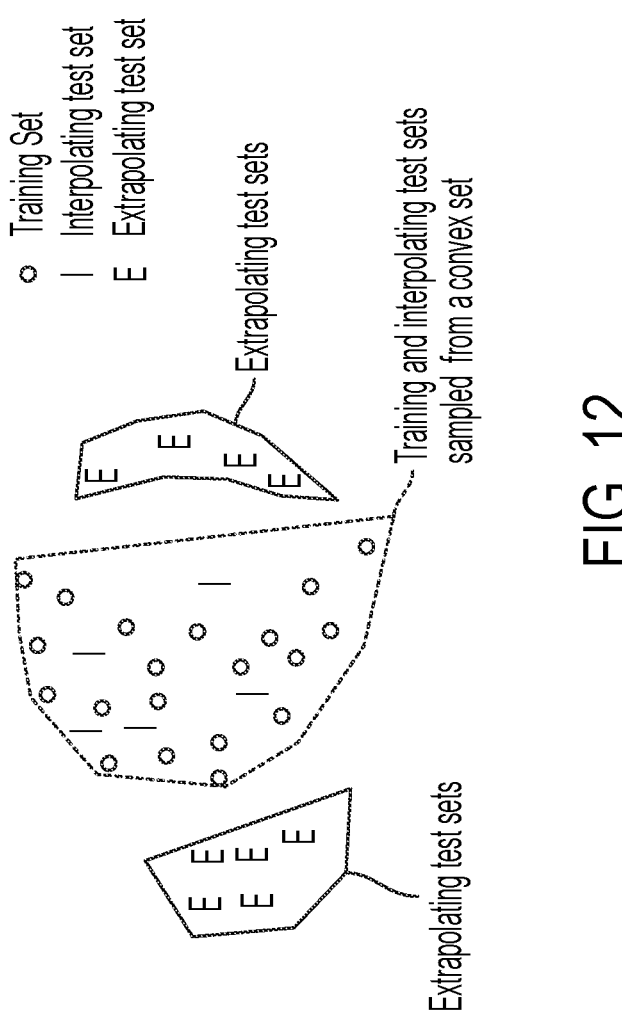
FIG. 12 is an illustration of a relationship between the recorded data, the extrapolative data, and the interpolative data when defined in relation to a complex hull.

FIGS. 5A and 5B are annotated brightfield images of experimental (recorded 21) data, where the micro-object 11 is highlighted by a white circle and the set of target positions in-between which the micro-object is translated are highlighted by magenta squares. FIG. 5A and FIG. 5B show two different experiments with two different sets of target positions. This experimental data 21 can be used as training data 22. FIG. 12 is an illustration of a relationship between the training data 22, the extrapolated data 23, and the interpolated data 33 when defined in relation to a complex hull. Still other kinds of training data are possible.

Figure 2:
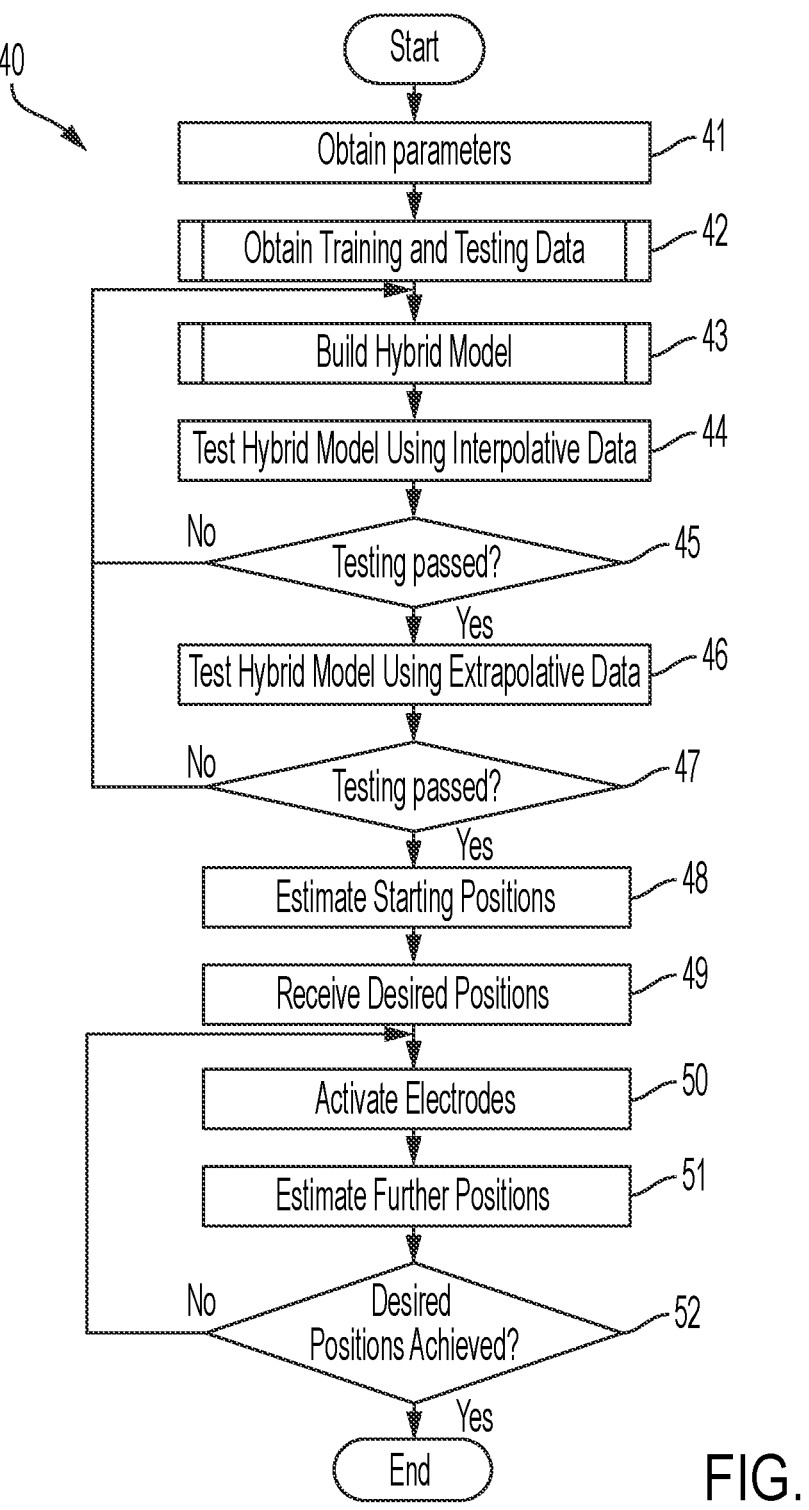
FIG. 2 is flow diagram showing a method for machine-learning-based position estimation for use in micro-assembly control with the aid of a digital computer.

As further described below beginning with reference to FIG. 2, the hybrid model 24 is created using gradient boosting implemented in many stages, during which one or more physics-based models are trained by selecting a loss function, with the next stages being implemented by selecting another model (machine-learning model 27) using residuals 31 and previous inputs as the new input and selecting a loss to boost (train) the next stage parameters, with the creation of additional models being iterated in this fashion multiple times.

Thus, during gradient boosting, initially, at least one physics-based model 26 is defined, and then a loss function 30 (also referred to as a whitening objective function 30) is used to analyze a difference between output training data 22 (a position of a micro-object 11 at a particular time after actuation) and one or more predictions made by using the physics-based model 26 regarding the achieved position of a micro-object 11 at the same time as described by the output training data following the same actuations based on the input training data. The result of that analysis are one or more residuals 31 (also known as a pseudo-residual 31), with each residual 31 describing the difference between one position predicted by the physics-based model 26 based on a piece of input training data 22 and a piece of output training data 22 resulting from the piece of input training data 22 based on which the prediction was made. Subsequently, during the next stage, a first machine-learning model 27 is built using the residuals 31 derived using the initial physics-based model 26—the first machine-learning model 27 is fitted based on the generalized residual 31 of the physics-based model 26. Subsequently, during the next stage, residuals 31 are generated for the first machine-learning model based on the training data 22 in the same way as described above—by using a loss function 30 to process a difference between micro-object positions predicted based on the input training data 22 and positions in the output training data 21. The residuals 31 from the first machine-learning model 30 are used to define another deep model, with residuals 31 for the second deep model being calculated in the same way as described above. Fitting the generalized residual of one machine-learning model 27 to the next machine-learning model 27 continues as a cascade in a plurality of stages until a desired number of models 26, 27 has been generated (with the desired number of models, in one embodiment, being based on past data regarding accuracy of a hybrid model that includes a certain number of models 26, 27; in a further embodiment, the desired number of models 26, 27 is set based on empirical testing of whether a predetermined number of models produces a desired accuracy). While in the above description, only a single physics-based model 26 is used as part of the hybrid model 24, in a further embodiment, multiple physics-based models 26 could be used as a part of the hybrid model. The one or more physics-based models 26 in the hybrid model 24 act as weak-learners, models whose predictions are only slightly better than random guessing, while the trained machine-learning models 27 act as strong-learners, which have a higher accuracy of prediction than weak learners. The predictions of all of the models 26, 27 are aggregated into a single prediction of the hybrid model 24, such as by assigning the predictions from different models weight and averaging the predictions, though other ways to aggregate the predictions are also possible. For example, the predictions of the various model stages 26, 27 could be aggregated into a combined prediction of the hybrid model 24 in accordance with equation (2) below as a sum or as product refinements if the residuals are expressed as factors rather than differences. The various stages could be assigned various weights as well. Mathematically, gradient boosting performed by the hybrid modeler 18 can be defined as follows:

A sequence of M learners is used to refine the predicted output. The weak (or base) models include physics/deterministic models 26 which are followed by machine-learning models to capture the predictable but complex portions.

$$\widehat{f(x)} = \hat{f}^M(x) = \sum_{i=0}^{M} \hat{f}_i(x) \qquad (2)$$

Where M is the number of iterations, $\hat{f}_0$ is the initial guess and $\hat{f}_t$ are the boosts or further families of approximations $$\widehat{f_t}(x) \leftarrow \widehat{f_{t-1}}(x) + h_t(x, \theta_t) \qquad (3)$$

Where $$\theta_t = \arg_\theta \min[\psi_i(y, \widehat{f_{t-1}}(x) + h_t(x_i, \theta_i))] \qquad (4)$$

Where $\psi_i(\cdot, \cdot)$ is a loss function for stage I. In summary the sequential method involves a number of stages where a model is fitted to the residuals of the previous stages using a specific loss function. In the present case of physical models encompassing the domain knowledge of assembly or physical system is the first stage.

FIG. 11 is a diagram illustrating gradient boosting in accordance with one embodiment.

Returning to FIG. 1, while the training data 22 is used for calculating the residuals 31, following the creation of the hybrid model 24, the hybrid modeler 18 uses extrapolated testing data 23 and the interpolated testing data 33 to test the predictions made by the hybrid model 24. Initially, the hybrid model 24 is tested against interpolative testing data 33. If the position predictions made by the hybrid model 24 based on input interpolated data 33 are within a certain error threshold from the output interpolative data 33 (indicating that the model 24 has been sufficiently trained), the hybrid model 24 is retained unchanged. If the position predictions made by the hybrid model 24 are outside the error threshold, the hybrid model 24 is revised. Such testing prevents overfitting of the hybrid model 24. Following the testing with interpolative data 33, the hybrid model is tested with extrapolative testing data 23 in the same way as for interpolative data 33 described above: by comparing position predictions made by the hybrid model 24 based on input extrapolative data 23 against the output extrapolative data 23. If the position predictions made by the hybrid model 24 based on input extrapolative data 23 are within a certain error threshold from the output interpolative data 23, the hybrid model 24 is retained unchanged. If the position predictions made by the hybrid model 24 are outside the error threshold, the hybrid model 24 is revised. Such testing using the extrapolative data 23 set helps to make sure that they hybrid model 24 has sufficient predictive and extrapolative ability rather than just being tied to a single training data 22 set.

As mentioned above, a loss function 30, denoted as $\psi(\cdot, \cdot)$ below, is used during calculation of residuals 31 during each of the stages of gradient boosting and the loss function 30 for must be selected by the hybrid model creator 18 for each of the stages. The loss of the function 30 is selected based on a stochastic model 102 (a model describing those aspects of the modeled system that are not easily predictable and that can vary from run to run) associated with the data that the hybrid model 24 is trying to predict (and consequently, associated with each stage of building the hybrid model 24). For example, when the hybrid model 24 will be used to predict continuous data (such as in the case of positions of the micro-objects 11), the stochastic model 102 is a Gaussian model. If the predicted data is counts, the stochastic model 102 is a Poisson model. If the predicted model is categories, the stochastic model 102 is a multinomial model. Still other kinds of the stochastic models 102 are possible.

Different loss functions 30 can be used in different stages of gradient boosting. One loss function 30 that can be used during calculating residuals when of a physics-based model 26 is mean squared error (MSE):

$$\Psi_i(y, f(x)) = \sum_{i=1}^{N} r_i^2 = \varrho_0 \qquad (5)$$

is sufficient where $\vartheta_i$ is the ith lag of the autocorrelation function of the residual $$r_i = y_i - f(x_i) \qquad (6)$$

However, MSE does not generally ensure that the residuals calculated as described above are compatible with the stochastic model 102, with the stochastic model 102 normally assuming independent, identical distributed (IID) random variables. Accordingly, the hybrid model creator 18 compares the calculated residuals 31 during each stage of gradient boosting to the stochastic model 102 using an autocorrelation function such as a zero mean Gaussian with variance $\sigma^2$. To select the loss function 30, the hybrid model creator 18 can use a Ljung-Box (LJB) loss function:

$$\Psi_i(y, f(x)) = n(n+2) \sum_{k=1}^{L} \frac{\rho_k^2}{n-k}, \qquad (7)$$

where ρ is the autocorrelation function at lag k and n is the sample size.

Using the LJB function ensures uncorrelated residuals 31 produced using the loss function 30 and compatibility of the residuals with the stochastic model 102. In the equation (7), L is a hyper parameter which is larger than possible correlations. For each stage of gradient boosting, using the loss function is selected to drive the output residuals 31 towards a desired goal (optimizing the loss function). Planning out the subsequent actuations allows to compensate for the control loop latency, and thus improve the performance of the system 10. In one embodiment, with the frame rate being every 60 Hz (though other values of the frame rate are possible), a control loop of about 2-3 frames from when a particle 11 is at a physical position to when the particle is evaluated to be at that position (due to image transfer and computational cost of image processing analysis) and about 1 frame delay for the actuation (the delay from when the particle is determined to be at a position to when the electrode potentials are generated to move the particle 11). The control policy 34 allows to compensate for this 3-4 frame delay and estimate the particle position for 3-4 frames ahead.

As moving micro-objects 11 to desired positions 35 most often takes multiple actuations, having an accurate starting position 28 of the micro-objects 11 after each actuation is crucial for generating appropriate electric potentials during a subsequent actuation to move the micro-objects 11 towards the desired positions 35 in the quickest fashion. FIG. 2 is a flow diagram showing a method 40 for machine-learning-based position estimation for use in micro-assembly control with the aid of a digital computer in accordance with one embodiment. The method 40 can be implemented using the system 10 of FIG. 1. Initially, parameters 19 of the system 10 are obtained and a control model 39 is generated using the parameters 19 (step 41). Training data 22 is obtained, as further described below with reference to FIG. 3 (step 42). A hybrid model 24 for predicting positions of one or more micro-objects 11 is built (step 43), as further described below with reference to FIG. 4. The accuracy of the hybrid model 24 is tested using interpolative data 33 as described above with reference to FIG. 1 (step 44), and if the result of testing are satisfactory and the testing is passed (step 45), the method moves to step 46. If the results of the testing are not satisfactory, the routine returns to step 43. The accuracy of the hybrid model 24 is further tested using extrapolative data as described above with reference to FIG. 1 (step 46), and if the result of testing are satisfactory and the testing is passed (step 47), the method moves to step 48. If the results of the testing are not satisfactory, the routine returns to step 43.

Desired positions of one or more of the micro-objects 11 are received, such as from a user (step 48). Starting positions 28 of the micro-objects 11 are obtained, either using only the images 29 captured by the camera 15 if the micro-objects 11 are at rest, or using the hybrid 24 model (which takes the data derived from the images 29 into account) if a previous actuation has been made and the micro-objects 11 are now in motion (and thus control loop latency is now a factor in determining their positions) (step 49). A control policy 34 for moving the micro-objects 11 towards the desired positions 35 is generated using the starting positions 28, the control model 39, and the desired positions 35 (step 50), and the electrodes 12 are actuated via the video projector 14 using the control policy 35 (step 51). If the desired positions 35 have been achieved following the actuation (such as determined using the hybrid model 24) (step 52), the method

40 ends. If the desired positions have not been achieved, the method 40 returns to step 50.

Figure 3:
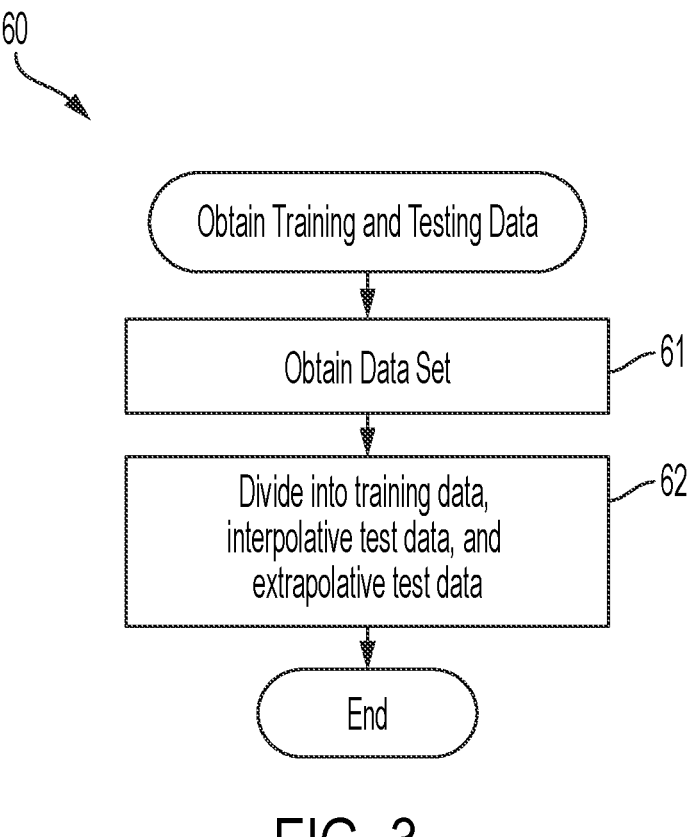
FIG. 3 is a flow diagram showing a routine for generating training data for use in the method of FIG. 2 in accordance with one embodiment.

Recorded data 21 is necessary for both training and testing of the hybrid model 24. FIG. 3 is a flow diagram showing a routine 60 for generating training 22 and testing data 101 for use in the method 40 of FIG. 2 in accordance with one embodiment. A set of recorded data 21 is obtained (step 61), and divided into training data 22 and testing data 101, with the testing data including interpolative data 33 (data falling with the bounds of the data set as training data 22) and extrapolative data 23 (data falling outside the bounds of the data set as training data 22) (step 62), ending the routine. In one embodiment, the data used as training data is 80% of the data set and the data used as testing data 101 is 20% of the data set, though other percentages are also possible.

Figure 4:
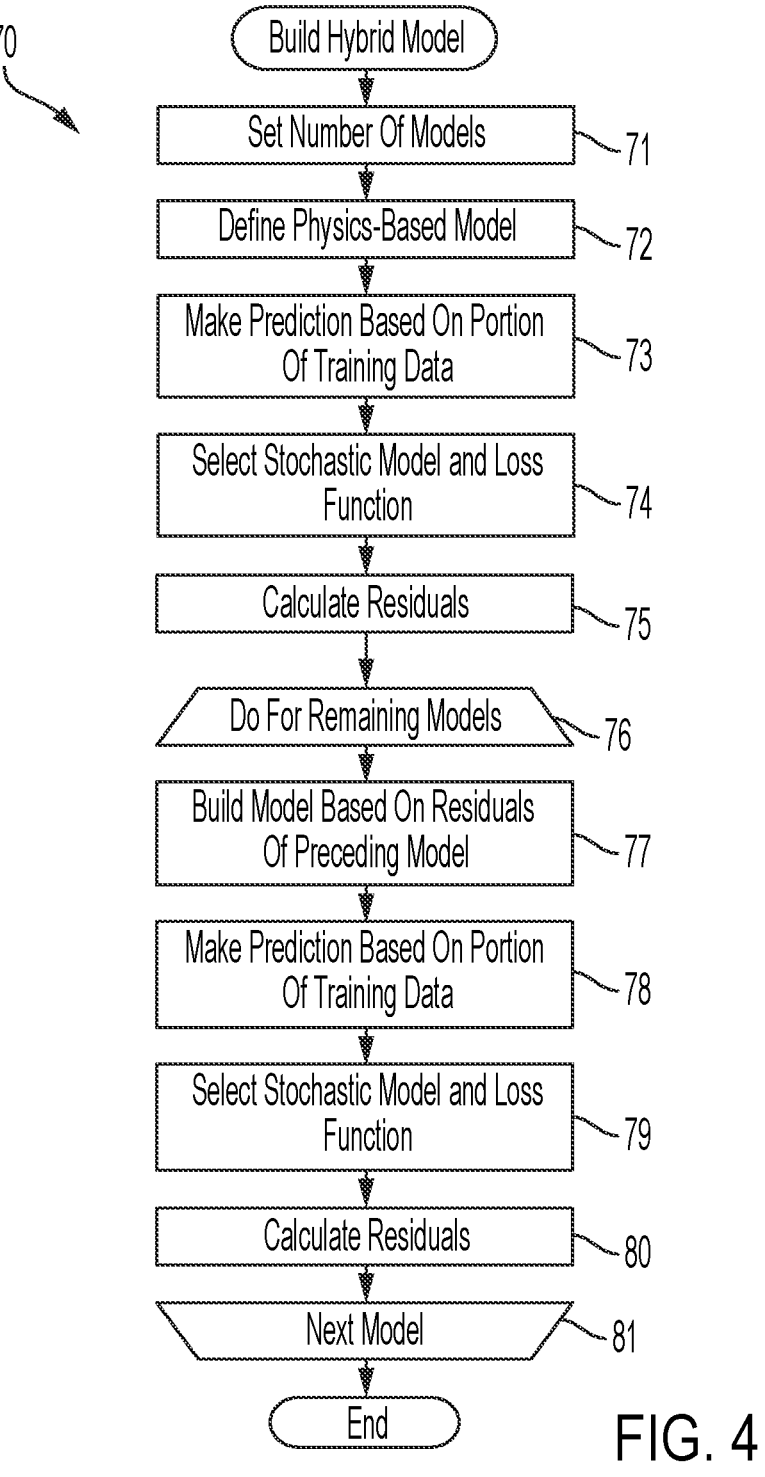
FIG. 4 is a flow diagram showing a routine for building the hybrid model for use in the method of FIG. 2 in accordance with one embodiment.

The hybrid model 24 built using gradient boosting combines predictions from at least one physics-based model 26 and one or more machine-learning models 27 to achieve a more accurate prediction of a micro-object's 11 position at a particular time (a time an electrode actuation using the predicted position takes place) due to taking into account both stochastic and deterministic dynamics of the system 10. FIG. 4 is a flow diagram showing a routine 70 for building the hybrid model 24 for use in the method 40 of FIG. 2 in accordance with one embodiment. Initially, a number of models 26, 27 to be included in the hybrid model 24 is set, such as based on user input, such as based on past performance of hybrid models 24 with certain numbers of models 26, 27 or based on continued testing of the hybrid model 24 being created during the method 60 (step 71). A physics-based model 26 is defined, such as using the parameters 19 (step 72). One or more predictions are made regarding positions of one or more micro-objects 11 at a particular time are made using the physics-based model 26 based on one or more pieces of input recorded data 21 (step 73). A stochastic model 102 associated with the data being predicted as described above with reference to FIG. 1 and a loss function 30 is selected as described above with reference to FIG. 1 (step 74). One or more residuals 31 are calculated using the selected loss function 30 based on a difference between the predictions made using the physics-based model and the output data associated with the input data used for making the predictions (recorded micro-object positions achieved due to actuation associated with the input data) (step 75). An iterative processing loop (steps 76-81) is initiated for all remaining models. A model is built (fitted) based on the residuals of a preceding model (step 77). Predictions are made regarding positions of one or more micro-objects 11 at a particular time are made using the model built in step 77 based on one or more pieces of input recorded data 21 (step 78). A stochastic model 102 is selected for the data being predicted as described above with reference to FIG. 1 and loss function 30 is selected based on the stochastic model 102 for the model built in step 77 as described above with reference to FIG. 1 (step 79). One or more residuals 31 are calculated using the selected loss function 30 based on a difference between the predictions made using the model built in step 77 and the output data associated with the input data used for making the predictions (recorded micro-object positions achieved at the same time used for the prediction due to actuation associated with the input data) (step 80). The processing loop of steps 76-81 moves to the next model (step 81) until the number of models 26, 27 to be included in the hybrid model 24 set in step 71 (including the physics-based model 26 defined in step 62) has been achieved, ending the routine 70. In the description above, in one

15

Figure 8:
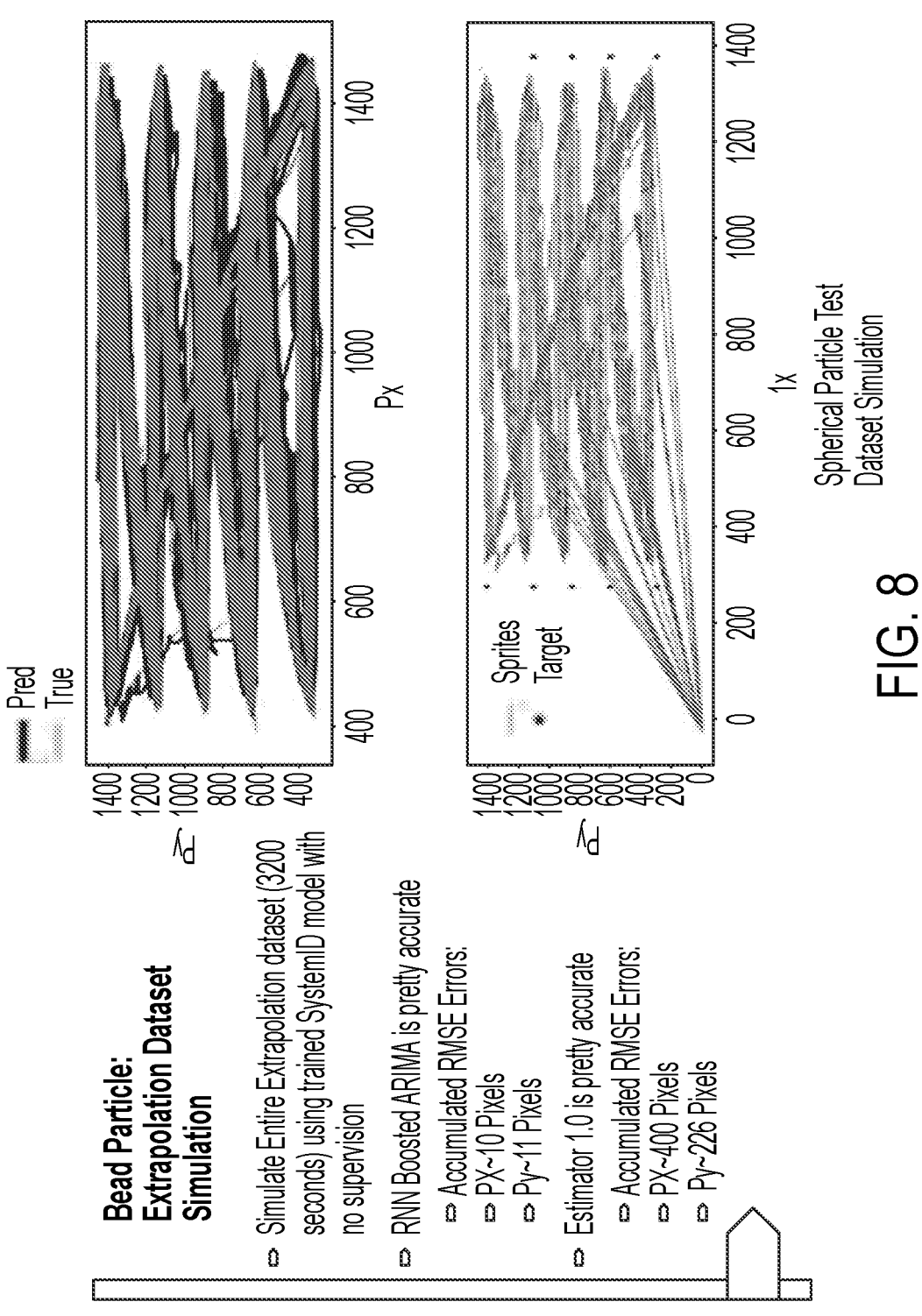
FIG. 8 is a diagram illustrating simulation of the enitre extrapolation data set (~50 min) using trained SystemID model with no supervision.

16 embodiment, all of the models created during the loop 76-81 can be machine-learning models 27. In a further embodiment, at least some of the models created during the loop 76-81 can be physics-based model 26. In a still further embodiment, a machine-learning model 27 instead of a physics-based model 26 can be created during step 72, and at least one physics-based model can be created during the loop The advantages of using the hybrid model 24 described above were experimentally tested, and experimental data, for purposes of illustration and not limitation, is given below. The model 24 was implemented in the system 10 using frugally-deep cpp library (though other implementations are possible), and the performance of the model 24 was compared to what is referred to an Estimator 1.0 below (implemented using a system similar to the system 10 except that no hybrid model 24 is employed), which estimates particle positions at time 1 by using their measured position within the feedback control at time 1–#n*⅟₆₀ s control cycle latency, an estimated constant number, #n, for the control cycle delay The performance of the hybrid model 24 was FIG. 8 is a diagram illustrating the simulation of an entire extrapolation data set (~50 min) using trained SystemID model with no supervision. The hybrid model 24 that included the RNN boosted Arima model performed best with an accumulated RMSE error of ~10 camera pixels, an inaccuracy of Sum for the final position of a 10 um spherical particle (micro-object 11). Estimator 1.0 resulted in an accumulated RMSE error of about 200-300 camera pixels (~100-150 um inaccuracy of the final particle position).

Figure 9:
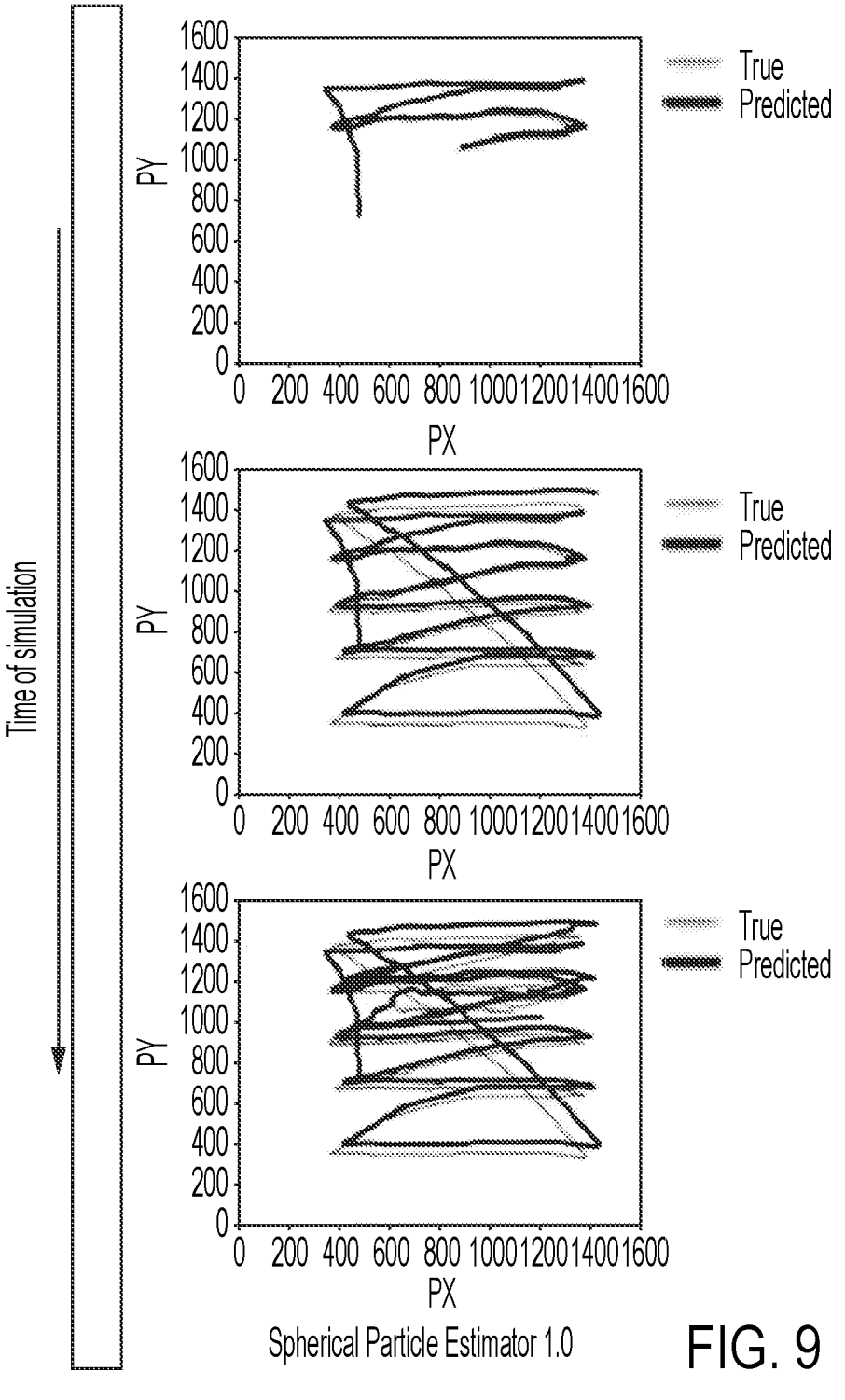
FIG. 9 is a diagram illustrating simulation of extrapolation data set using trained SystemID model with no supervision.
Figure 9:
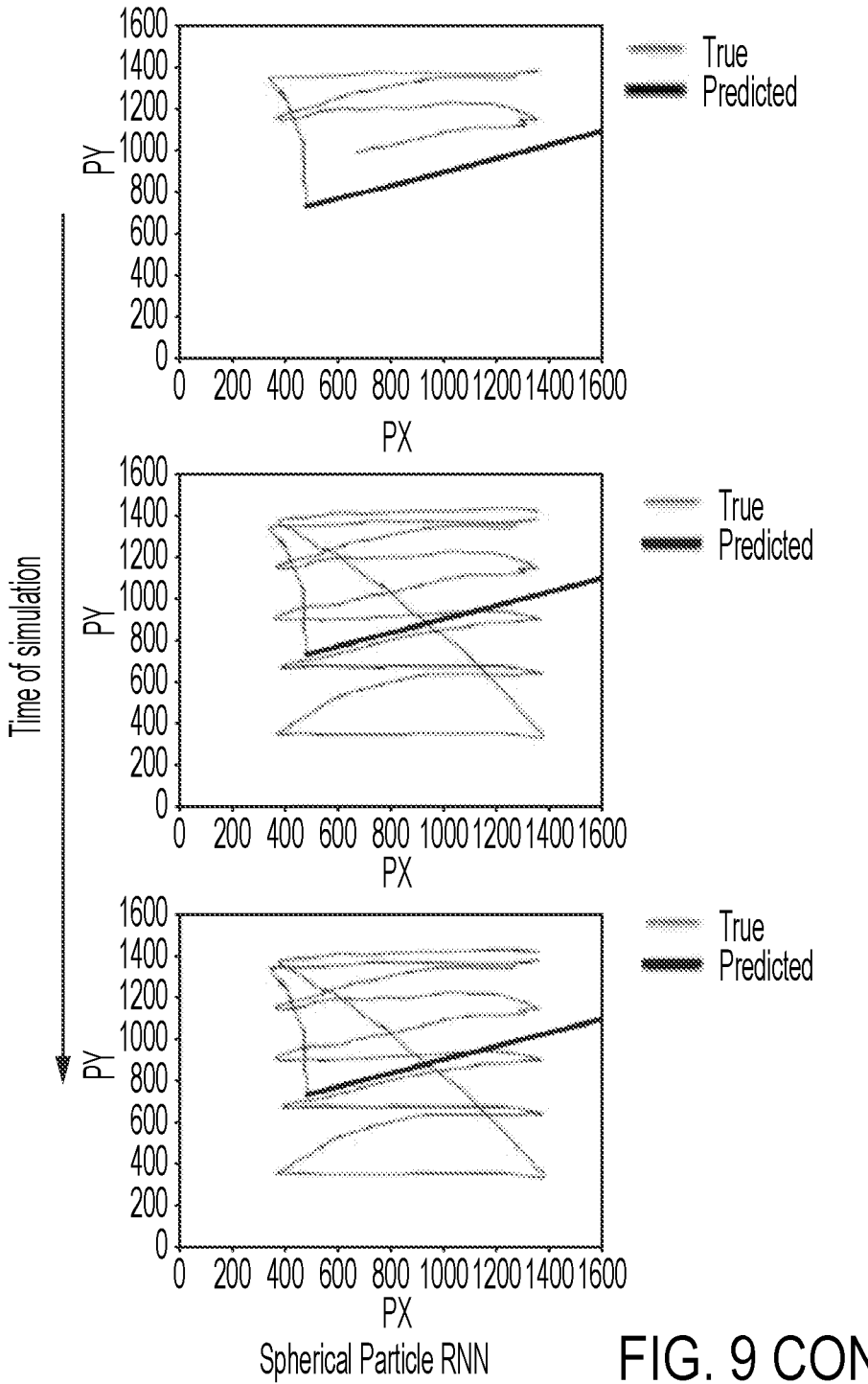
Figure 9:
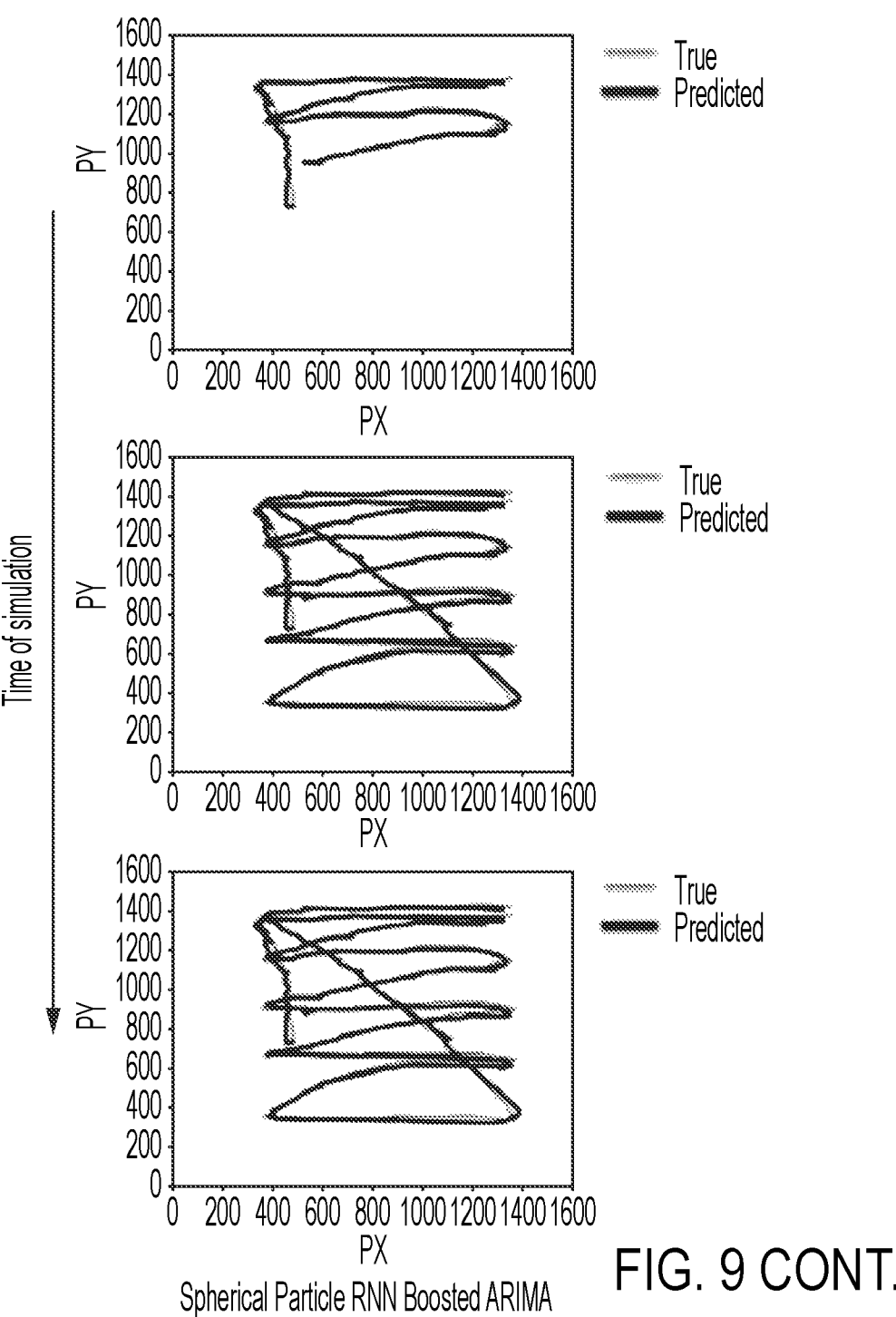

FIG. 9 is a diagram illustrating simulation of an extrapolation data set using trained SystemID model with no supervision. Hybrid model 24 that included RNN boosted Arima model performed best with true (gray) and predicted (black) particle positions deviating slightly with an accumulated RMSE error of ~10 camera pixels, an inaccuracy of Sum for the final position of a 10 um spherical particle (micro-object 11). Use of Estimator 1.0 resulted in an accumulated RMSE error of about 200-300 camera pixels (~100-150 um inaccuracy of the final particle position). RNN model did not predict particle positions accurately.

TABLE 1

| Base network | | Estimator 2.0 | Linear/ StateSpace | Linear/StateSpace Boosted | Dense | Dense Boosted | Anime/w LSTM | Anime/w LSTM Boosted |
|---|---|---|---|---|---|---|---|---|
| Input | | Sense pos 0 + 4 x (act pos) | 4 x (sense pos, sense T, act pos, act T) | | | | | |
| Training Data | | N/A | 2 hours of driving an A2P particle in simulator with Estimator 2.0 | | | | | |
| Evaluation | | Driving an AZP particle in simulator for 60 seconds; Test predictions against sensed value recorded 4 (2 + 2) frames later | | | | | | |
| Average Error, pixels | | 2.54 | 1.96 | 1.97 | 1.93 | 1.68 | 1.35 | 1.22 |
| Max Error, pixels | | 8.82 | 7.40 | 9.06 | 8.54 | 8.61 | 8.00 | 6.44 |
| # particles; | 10 | 0.8 | 0.7 | 0.8 | 0.7 | 1.1 | 0.8 | 1.0 |
| Average | 50 | 1.2 | 1.4 | 2.2 | 1.4 | 2.5 | 1.8 | 3.0 |
| Duration, | 250 | 2.4 | 7.2 | 11.2 | 6.9 | 11.2 | 8.4 | 15.0 |
| ms | ~1000 | 4.8 | 30.7 | 50.2 | 29.2 | 49.3 | 37.4 | 62.1 | also compared to a performance of a system similar to system 10 except that instead of a hybrid model 24, only a machine learning model 26 is used for determining the particle position. FIG. 6 is a diagram showing test results of the Estimator 1.0 as compared to: the use of the hybrid model 24 that included RNN model as the machine-learning model 27 ("Estimator 1.0 boosted with RNN"); the use of only the ARIMA model for predicting the particle position; the use of the ARIMA model boosted with RNN model (two machine learning models 26) for predicting the particle position; and the use of the RNN model as the machine-learning model 27. The hybrid model 24 that included the ARIMA model and the hybrid model that included the RNN model showed more than two fold better predictions regarding positions (x, y, surrounded by boxes) of a micro-objects 11 (referred to as "particle") than the Estimator 1.0. These results were obtained using recorded data 21 shown with reference to FIG. 5A (with positions also being referred to as "waypoints").

Even when extrapolated data 23 is used for testing, the hybrid model 24 performs better than Estimator 1.0. FIG. 7 is diagram showing results of the use of the Estimator 1.0 versus ARIMA model and RNN model within extrapolation test data set. The hybrid model 24 that included ARIMA model and the hybrid model 24 that included ARIMA model boosted with RNN model showed about 1.5-fold better predictions of particle (micro-object 11) position in x and y (surrounded by boxes), whereas the RNN model performed worst on the extrapolation test data set (surrounded by boxes).

The hybrid model 24 also performs better than using pure machine-based learning models. Table 1 illustrates the comparative accuracy of the hybrid model 24 (referred to as Estimator 2.0 in Table 1) versus Linear, Dense, and Arima model implemented using frugally-deep (cpp). Models were trained on 2 h random generated set of waypoints, (micro-object positions) and tested in new waypoint set for 1 min in simulator mode of MicroAssembler software. ARIMA model again showed 2-fold improvement in predicting particle positions compared to an improved estimator model, Estimator 2.0, (darker colored boxes). Implementation runs faster than 60 Hz (control cycle clock) for predicting positions of hundreds of particles (micro-objects 11) but did not scale to 1000 particles in this particular experiment (lighter colored box).

Figure 10A:
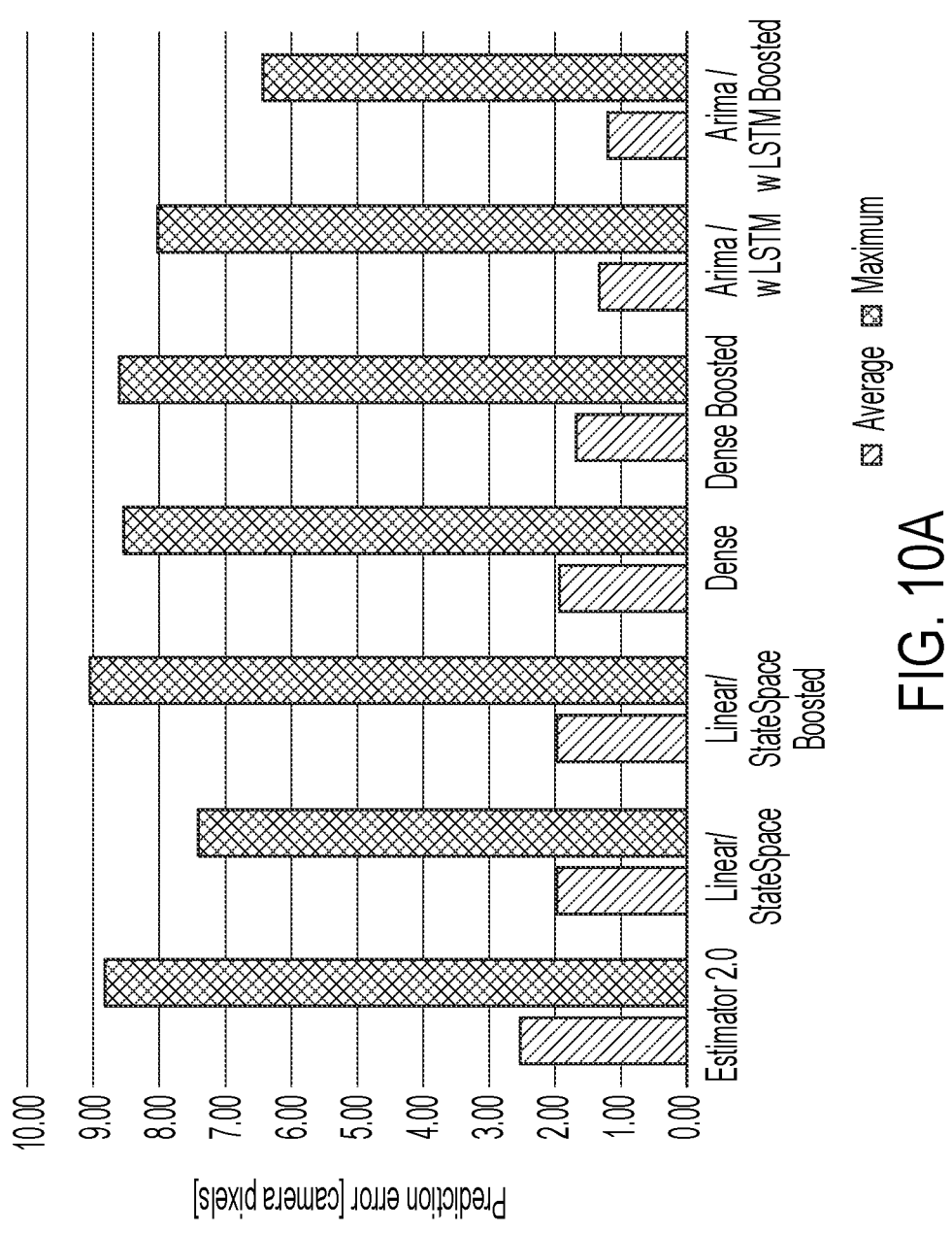
FIGS. 10A and 10B are diagrams illustrating testing Estimator 2.0 (the hybrid model) versus Linear, Dense, and ARIMA models implemented in MicroAssembler software using frugally-deep (cpp).
Figure 10B:
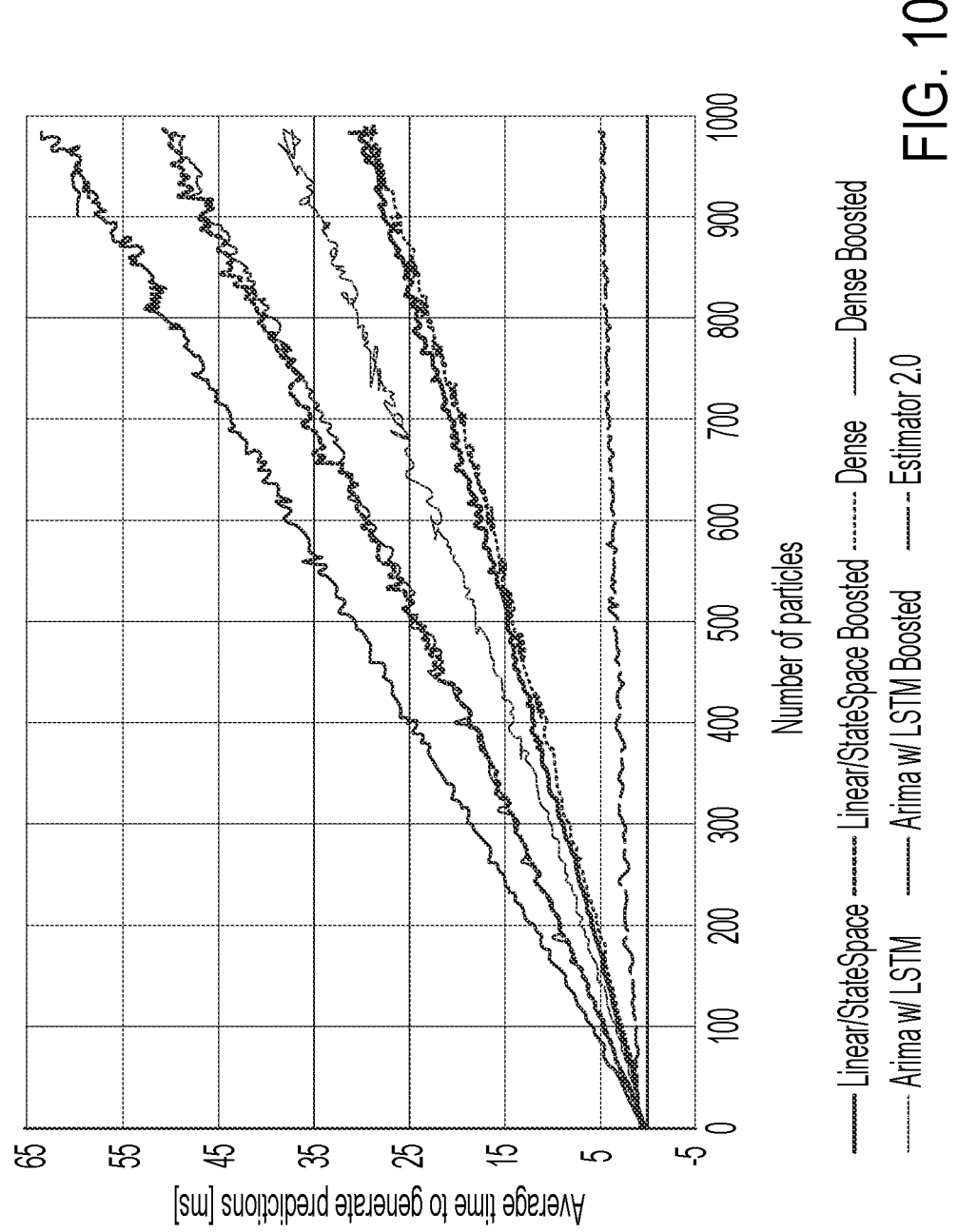

FIGS. 10A and 10B are diagrams illustrating testing Estimator 2.0 (the hybrid model 24) versus Linear, Dense, and ARIMA models implemented in MicroAssembler software using frugally-deep (cpp). FIG. 10A illustrates average prediction error rates decreased by >1 camera pixel for the RNN (LSTM) boosted Arima model compared to the improved Estimator 2.0 model. FIG. 10B illustrates implementations using deep and RNN models running faster than 60 Hz (internal control cycle clock) for predicting positions of <300 particles (micro-objects 11), though not scaling to 1000 particles in this particular experiment.

While the invention has been particularly shown and described as referenced to the embodiments thereof, those skilled in the art will understand that the foregoing and other changes in form and detail may be made therein without departing from the spirit and scope of the invention.

What is claimed is:

1. A method for hybrid-model-based micro-assembly control with the aid of a digital computer, comprising steps of:

the aid of a digital computer, comprising steps of:

obtaining one or more parameters of a closed-loop system for positioning one or more of a plurality of micro-objects, the system comprising a plurality of programmable electrodes, the electrodes configured to induce movements of the micro-objects when the micro-objects are proximate to electrodes upon actuations of the electrodes, each of the actuations comprising a generation of one or more electric potentials by one or more of the electrodes;

obtaining recorded data comprising input states and output states associated with previous movements of one or more of the plurality of the micro-objects due to earlier ones of the actuations;

building a hybrid model for predicting one or more positions of at least one of the micro-objects following one or more of the actuations, the hybrid model comprising a plurality of models, using the recorded data via gradient boosting, comprising:

defining a number of the plurality of models to be included into the hybrid model based on user input, wherein the plurality of models comprises a physics-based model and remaining models;

defining the physics-based model as one of the plurality of models using one or more of the parameters;

making, using the physics-based model, a prediction regarding one of the positions of one of the micro-objects using one of the input states;

using a loss function to determine a residual between the physics-based model prediction and one of the output states associated with the one input state used for the physics-based model prediction;

building one of the remaining models using the residual associated with the physics-based model; and processing one or more of the remaining models in the hybrid model until a number of the models built equals the defined number, wherein at least some of the processed remaining models are machine-learning models, comprising:

making, using one of the remaining models, a prediction regarding one of the positions of one of the micro-objects using one of the input states;

using a further loss function to determine a residual between the remaining model's prediction and one of the output states associated with the one input state used for the remaining model's prediction; and building another one of the remaining models using the residual for the remaining model's prediction; and controlling the closed-loop system to perform one or more of the actuations based on the hybrid model, wherein the steps are performed by a suitably-programmed computer.

2. A method according to claim 1, further comprising selecting the loss function and each of the further loss functions.

3. A method according to claim 2, further comprising selecting a stochastic model associated with the physics-based model and a further stochastic model associated with each of the remaining models, wherein the loss function is selected based on the stochastic model and each of the further loss functions is selected based on one of the further stochastic models.

4. A method according to claim 3, wherein selecting the loss function comprises comparing residual obtained using the loss function to the stochastic model and selecting each of the further loss functions comprises comparing the residual obtained using the further loss function to one of the further stochastic models.

5. A method according to claim 4, wherein one or more of the comparisons are performed using an autocorrelation function.

6. A method according to claim 5, wherein the autocorrelation function comprises a zero mean Gaussian function.

7. A method according to claim 3, wherein the stochastic model and the further stochastic models are Gaussian models.

8. A method according to claim 1, wherein the user input for the number of the models to be included in the hybrid model is based on a past performance of further hybrid models.

9. A method according to claim 1, further comprising:

aggregating the predictions of the models in the hybrid model into a prediction of the hybrid model, wherein the closed loop system is controlled based on the prediction of the hybrid model.

10. A method according to claim 9, wherein aggregation of the predictions comprises assigning a weight to each of the predictions of each of the models in the hybrid model.

11. A system for hybrid-model-based micro-assembly control utilizing loss function selection with the aid of a digital computer, comprising:

at least one processor configured to:

obtain one or more parameters of a closed-loop system for positioning one or more of a plurality of micro-objects, the system comprising a plurality of programmable electrodes, the electrodes configured to induce movements of the micro-objects when the micro-objects are proximate to electrodes upon actuations of the electrodes, each of the actuations comprising a generation of one or more electric potentials by one or more of the electrodes;

obtain recorded data comprising input states and output states associated with previous movements of one or more of the plurality of the micro-objects due to earlier ones of the actuations;

build a hybrid model for predicting one or more positions of at least one of the micro-objects following one or more of the actuations, the hybrid model comprising a plurality of models, using the recorded data via gradient boosting, comprising:

define a number of the plurality of models to be included into the hybrid model based on user input, wherein the plurality of models comprises a physics-based model and remaining models;

build the physics-based model as one of the plurality of models using one or more of the parameters;

make, using the physics-based model, a prediction regarding one of the positions of one of the micro-objects using one of the input states;

select a loss function;

use the loss function to determine a residual between the physics-based model prediction and one of the output states associated with the one input state used for the physics-based model prediction;

build one of the remaining models using the residual associated with the physics-based model; and process one or more of the remaining models in the hybrid model until a number of the models built equals the defined number, wherein at least some of the remaining models are machine-learning models, comprising:

make, using one of the remaining models, a prediction regarding one of the positions of one of the micro-objects using one of the input states;

select a further loss function for that remaining model;

use the further loss function to determine a residual between the remaining model's prediction and one of the output states associated with the one input state used for the remaining model's prediction; and build another one of the remaining models using the residual for the remaining model's prediction; and control the closed-loop system to perform one or more of the actuations based on the hybrid model.

12. A system according to claim 11, the at least one processor further configured to select a stochastic model associated with the physics-based model and a further stochastic model associated with each of the remaining models, wherein the loss function is selected based on the stochastic model and each of the further loss functions is selected based on one of the further stochastic models.

13. A system according to claim 12, wherein selecting the loss function comprises comparing residual obtained using the loss function to the stochastic model and selecting each of the further loss functions comprises comparing the residual obtained using the further loss function to one of the further stochastic models.

14. A system according to claim 13, wherein one or more of the comparisons are performed using an autocorrelation function.

15. A system according to claim 14, wherein the autocorrelation function comprises a zero mean Gaussian function.

16. A system according to claim 12, wherein the stochastic model and the further stochastic models are Gaussian models.

17. A system according to claim 11, wherein the user input for the number of the models to be included in the hybrid model is based on a past performance of further hybrid models.

18. A system according to claim 11, the at least one processor:

aggregate the predictions of the models in the hybrid model into a prediction of the hybrid model, wherein the closed loop system is controlled based on the prediction of the hybrid model.

19. A system according to claim 18, wherein aggregation of the predictions comprises assigning a weight to each of the predictions of each of the models in the hybrid model.

20. A system for hybrid-model-based micro-assembly control utilizing stochastic-model-based loss function selection with the aid of a digital computer, comprising:

at least one processor configured to:

obtain one or more parameters of a closed-loop system for positioning one or more of a plurality of micro-objects, the system comprising a plurality of programmable electrodes, the electrodes configured to induce movements of the micro-objects when the micro-objects are proximate to electrodes upon actuations of the electrodes, each of the actuations comprising a generation of one or more electric potentials by one or more of the electrodes;

obtain recorded data comprising input states and output states associated with previous movements of one or more of the plurality of the micro-objects due to earlier ones of the actuations;

build a hybrid model for predicting a position of at least one of the micro-objects following one of the actuations, the hybrid model comprising a plurality of models, using the recorded data via gradient boosting, comprising:

define a number of the plurality of models to be included into the hybrid model based on user input, wherein the plurality of models comprises a physics-based model and remaining models;

build the physics-based model as one of the plurality of models using one or more of the parameters;

make, using the physics-based model, a prediction regarding one of the positions of one of the micro-objects using one of the input states;

select a loss function based on a stochastic model associated with the physics-based model prediction;

use the loss function to determine a residual between the physics-based model prediction and one of the output states associated with the one input state used for the physics-based model prediction;

building one of the remaining models using the residual associated with the physics-based model; and process one or more of the remaining models in the hybrid model until a number of the models built equals the defined number, wherein at least some of the remaining models are machine-learning models, comprising:

make, using one of the remaining models, a prediction regarding one of the positions of one of the micro-objects using one of the input states;

select a further loss function for that remaining model based on a further stochastic model associated with the remaining model's prediction;

use the further loss function to determine a residual between the remaining model's prediction and one of the output states associated with the one input state used for the remaining model's prediction; and build another one of the remaining models using the residual for the remaining model's prediction; and control the closed-loop system to perform one or more of the actuations based on the hybrid model.

* * * * *